United States Patent [19]

Hostettler

[11] Patent Number: 4,559,366

[45] Date of Patent: Dec. 17, 1985

[54] PREPARATION OF MICROCELLULAR POLYURETHANE ELASTOMERS

[75] Inventor: Fritz Hostettler, Freehold, N.J.

[73] Assignee: Jaquelyn P. Pirri, White Plains, N.Y.; a part interest

[21] Appl. No.: 594,574

[22] Filed: Mar. 29, 1984

[51] Int. Cl.$^4$ ............................................. C08G 18/14
[52] U.S. Cl. ..................................... 521/51; 36/25 R; 521/137; 521/159; 528/60; 528/66
[58] Field of Search .......................... 521/51, 159, 137; 528/60, 66; 36/25 R

[56] References Cited

U.S. PATENT DOCUMENTS

| | | | |
|---|---|---|---|
| 3,304,273 | 2/1967 | Stamberger | 521/137 |
| 3,383,351 | 5/1968 | Stamberger | 521/137 |
| 3,644,457 | 2/1972 | Konig et al. | 521/159 |
| 4,042,537 | 8/1977 | Dahm et al. | 521/174 |
| 4,111,861 | 9/1978 | Godlewski | 521/904 |
| 4,125,691 | 11/1978 | White | 521/159 |
| 4,374,210 | 2/1983 | Ewen et al. | 521/159 |
| 4,448,903 | 5/1984 | Liang et al. | 521/137 |

*Primary Examiner*—Maurice J. Welsh
*Attorney, Agent, or Firm*—Vincent P. Pirri

[57] ABSTRACT

There are provided improved integral skin microcellular polyether polyurethane elastomer products, e.g., shoe soles, which are characterized by outstanding low temperature dynamic flex and green strength at demold, at specific gravities as low as about 0.4 gm/cc. These elastomer products are desirably prepared from a two-component system, e.g., the reaction of Component A containing improved quasi-prepolymers, with Component B comprising a compatible liquid mixture containing poly(oxyethyleneoxypropylene)polyol, difunctional chain extender, halogenated blowing agent and other ingredients, as needed, over a relatively wide isocyanate index range without the drawback of any significant loss in the elastomer properties due to index fluctuation within said range.

Improved integral skin microcellular polyether elastomers of low densities, e.g., 0.45 gm/cc, characterized by an excellent smooth surface appearance essentially devoid of blemishes can also be prepared from such two-package systems without the use of water as a secondary blowing agent.

The said quasi-prepolymers are normally-liquid, may have crystalline points as low as −20° C., and are derived from the reaction of (1) a mixture of normally solid diphenylmethane diisocyanate, carbodiimide and/or uretone imine and (2) poly(oxyethyleneoxypropylene)polyols.

41 Claims, No Drawings

PREPARATION OF MICROCELLULAR POLYURETHANE ELASTOMERS

BACKGROUND OF THE INVENTION

1. Field of the Invention

This invention relates to the manufacture of microcellular polyurethane elastomers having wide applicability in the footwear and automotive industries.

2. Description of the Prior Art

Polyurethane microcellular elastomers are employed in a wide number of end use applications as in the shoe and automotive industries, for example, in the manufacture of shoe soles, bumpers for automotive applications, arm rests of integral skin foams, and the like. In a number of applications a proper balance of physical properties is required in order to achieve optimum results for the intended commercial use.

The manufacture of microcellular urethane elastomers from polyether polyols and prepolymers from 4,4'-diphenylmethane diisocyanate (4,4'-MDI) is well known in the art. The reason such elastomer products are not made by means of the "one-shot" process is due to the fact that the isocyanate reactant, 4,4'-MDI, is not readily miscible in the polyether polyol/glycol chain extender/blowing agent mixtures commonly employed. Moreover, pure 4,4'-MDI has a melting point of approximately 40° C., and at such temperatures the handling of these materials becomes difficult in many of the end use applications illustrated above.

The literature, for example, U.S. Pat. No. 3,644,457, describes the preparation of quasi-prepolymers from various polyether polyols and 4,4'-diphenylmethane diisocyanate having, generally, melting points of from 15°-25° C. In the footwear and automotive industries, it is highly desirable to have the chemical reactants remain liquid during storage and at the average operating temperatures employed during the manufacture of microcellular elastomer products. Once the quasi-prepolymers crystallize, proper action must be taken to reform the original liquid to prevent subsequent dimerization and trimerization, which proceeds rather quickly, with concomitant deterioration of clarity and assay of the product. The recommended technique for melting such crystallized material is slow drum rolling in atmospheric steam. The disadvantages are obvious and well-known in the art. Typical polyisocyanate products that find wide use in the abovesaid fields are the quasi-prepolymers from di(propylene glycol) or dipropylene glycol/tripropylene glycol mixtures and 4,4'-diphenylmethane diisocyanate having equivalent weights of about 180-185. These quasi-prepolymers find extensive use in footwear and automotive applications, but they suffer from the above-mentioned drawbacks inasmuch as their melting points are approximately 17°-25° C., where they exhibit a tendency for dimer and trimer formation.

For automotive applications, mixtures of the abovesaid quasi-prepolymers (from dipropylene glycol and 4,4'-MDI) with the carbodiimides from 4,4'-MDI, described in U.S. Pat. No. 3,644,457 and German Pat. No. 1,092,007, remain liquid at near 15°-20° C.; however, for footwear applications these mixtures are of little use since integral skin microcellular elastomers therefrom exhibit poor low temperature flex properties.

It is known to prepare quasi-prepolymers from polyether polyols and 4,4'-diphenylmethane diisocyanate that are liquid at relatively low temperature, for example, at 10° C. However, in order for such quasi-prepolymers to remain liquid, the polyether segment of the quasi-prepolymer is at least 50-55% by weight, or more. Such quasi-prepolymers exhibit equivalent weights per NCO group of about 300 or higher. There exists several disadvantages associated with these quasi-prepolymers. In multicomponent systems such as two component systems generally employed in the manufacture of intergal skin microcellular polyurethane elastomer articles, e.g., shoe soles, automotive articles, etc., the high NCO equivalent weights of the polyisocyanate component requires that the "resin" component be a polyol blend comprising high levels of chain extender, e.g., ethylene glycol or 1,4-butanediol. Unfortunately, at such high levels of chain extender which are generally required for the manufacture of medium to high hardness shoe soles and automotive articles (65-95 Shore A hardness) the required resin blend of polyether polyol/chain extender/fluorocarbon blowing agent generally becomes quite incompatible thereby imposing significant processing problems and limitations on such systems. Moreover, bulk shipments and/or storage for even short periods of time are not economically tolerable due to the resulting phase separation of the polyol and the chain extender. Even in use, processing requires appropriate mixing to prevent phase separation. Incompatibility of the system and/or marginal mixing can adversely effect the physical properties of the ultimate elastomer products. As soon as the reactant materials deviate appreciably from the stoichiometric balance between hydroxyl and isocyanate ingredients, the resulting products, for example shoe soles, will crack during wear, making these articles useless in commerce.

An additional drawback of the high NCO equivalent weights, e.g., about 300 and higher, which characterize such quasi-prepolymers is the substantially lower exotherm that multi-component systems are capable of generating during the molding operation since a significant portion of this exotherm has already been dissipated during the formation of the quasi-prepolymers per se. Hence, such systems require the addition of substantial heat during the molding process if one desires short demolding times. The application of substantial external heat (hot molding) process instead of a colder molding process) and the extended mold cycles make such combinations less attractive for economic reasons.

SUMMARY OF THE INVENTION

The invention provides for improved integral skin microcellular polyether polyurethane elastomers of a wide specific gravity range, e.g., about 0.4 gm/cm$^3$ to about 0.7 gm/cm$^3$, which are characterized by a combination of properties such as Shore A hardness and compression modulus values, tensile and tear strengths as well as resiliency or rebound of the skin as well as core portions of said elastomers that significantly exceed the same combination of properties found in conventional integral skin microcellular polyether polyurethane elastomers of equivalent specific gravity.

It has also been discovered that improved integral skin microcellular polyether polyurethane elastomers of relatively low specific gravities can be prepared which are characterized by a combination of physical and mechanical properties, e.g., tensile strength and elongation, Die C tear and split tear, dynamic flex properties at room temperature and at low temperatures, Shore A skin and core hardness, load bearing performance, heat resistance, as well as oil resistance which are substantially equivalent or even better to the same combination of properties characterizing the conventional integral skin microcellular polyether elastomers of higher specific gravities. This latter discovery affords marked economic advantages since the raw material requirements to produce the improved elastomers can be as much as 20-30 percent lower than the conventional elastomers, the combination of properties of both types of elastomers being approximately equivalent.

It has further been discovered that by the practice of the inventions contemplated herein, there can be produced integral skin microcellular polyether polyurethane elastomers which exhibit a combination of outstanding low temperature dynamic flex properties and green strength at the time of demold, at specific gravities approximating 0.4-0.5 gm/cm$^3$, and higher, which properties heretofore have not been attainable in integral skin polyurethane elastomers from comparable conventional polyether polyol systems. The term "green strength", as is known in the art, denotes the basic integrity and strength of the polyurethane polymer at demold. The polymer skin of a molded item, for example, a shoe sole and other molded articles, should possess sufficient tensile modulus and elongation and tear strength to survive a 90 to 180 degree bend without exhibiting surface cracks. The prior art processes oftentimes require 3-4 minutes minimum demold times to attain this characteristic. In general, as the artisan improves the green strength characteristic, there is a concomitant decrease in low temperature dynamic flex life of the elastomer and vice-versa. In the practice of various aspects of the invention the novel multi-component systems provide up to 150 seconds improvement in minimum demold times. That is to say, demold times of about 1.5 to about 2.5 minutes are achievable while providing integral skin microcellular products having outstanding low temperature dynamic flex and green strength characteristics.

The term "isocyanate index", as known in the polyurethane art, is the quotient obtained by dividing the equivalents of NCO by the sum of the equivalents of active hydrogen group(s), multiplied by 100. By way of illustration, a formulation for the manufacture of integral skin microcellular shoe soles may comprise a quasi-prepolymer based on 4,4'-MDI as Component A and, as Component B or the "resin", a mixture comprising polyol, 1,4-butanediol chain extender, blowing agent, water, etc. The isocyanate index, therefore, expressed in equation form is shown below:

$$\text{Isocyanate Index} = \frac{\Sigma \text{ Equivalent NCO}}{\Sigma \text{ Total Equivalent OH}} \times 100$$

wherein "Σ Equivalent NCO" represents the equivalents of quasi-prepolymer (Component A) and wherein "Σ Total Equivalent OH" represents the sum of the equivalents of polyol, 1,4-butanediol and water (Component B). In the practice of the present inventions the isocyanate index is expressed as a number approximating 100 as will be developed hereinafter.

The outstanding properties characterizing the microcellular polyether elastomers of the invention can be achieved using multi-component systems, e.g., two and three component systems, over a surprisingly wide isocyanate index range of from about 94 to about 105, and desirably from 97 to 103. In general, variations outside the conventional narrow index range during manufacturing operations can result in higher reject rates (of molded product), lower production, and product of poor quality and inferior properties. The systems of the present invention are characterized by their ability to offer the fabricator greater process latitude during manufacturing operations by virtue of their broad isocyanate index range. Thus, minor fluctuations from the targeted index during operations can be tolerated without suffering the aforesaid disadvantages. Moreover, not only can the process aspect of the invention be effected using systems over a wider isocyanate index range, but the overall combination of polymer properties of the microcellular polyether elastomers resulting therefrom exceed those of conventional microcellular polyether elastomers measured at equivalent densities.

Accordingly, one or more of the following objects will be achieved by the practice of the inventions contemplated herein.

It is an object of the invention to provide unique liquid quasi-prepolymers derived from polyether polyols and liquid mixtures comprising a diphenylmethane diisocyanate.

It is another object to provide unique microcellular elastomers, in particular, molded integral skin microcellular polyether polyurethane elastomers, which are characterized by a combination of outstanding low temperature dynamic flex properties and green strength at demold, at specific gravities approximating as low as about 0.4 gm/cm$^3$.

It is yet another object to provide novel multi-component systems which permit the manufacturer to operate over a wide isocyanate index range in the fabrication of unique molded microcellular polyether elastomers without suffering any significant loss of elastomer properties due to index fluctuation within said range.

A still further object is to provide unique microcellular polyether polyurethane elastomers which are characterized by a combination of mechanical properties such as spit tear, tensile and ultimate elongation which exceed, measured at equivalent densities and manufactured at equivalent NCO indices, the mechanical properties of conventional microcellular polyether polyurethane elastomers.

A still further object of the invention is to provide unique integral skin microcellular polyether elastomers of low density, characterized by a combination of the above-said mechanical properties, which approximate or exceed the comparable properties of conventional integral skin microcellular polyether elastomers having significantly higher densities, e.g., of the order of 20-30% higher density values.

A yet further object of the invention is to provide integral skin microcellular polyether polyurethane elastomers of specific densities below 0.55 gm/cm$^3$, desirably from about 0.5 to about 0.4 gm/cm$^3$, and perhaps slightly lower, which are void of sink marks (shrinkage) and inferior skin surface which often characterize conventional microcellular polyether polyurethane elastomers of equivalent specific densities.

A still further object of the invention is to provide novel integral skin microcellular polyurethane elastomer products of excellent low temperature dynamic flex and green strength properties from novel multi-component polyether systems which exhibit at least about 30 seconds (and even upwards to about 90 seconds and higher) improvement in minimum demold times versus the conventional polyether systems, at equivalent foam reactivities. This decrease in demold times translates into an improvement in cycle time of the order approximating 20-40 percent, the polyurethane foaming reaction being effected at equivalent NCO indices for both the novel and conventional systems.

These and other objects and advantages will become apparent to those skilled in the art from a consideration of this specification.

DETAILED DESCRIPTION OF THE INVENTION

It has now been discovered quite unexpectedly, indeed, that microcellular polyether polyurethane elastomers such as molded integral skin articles, e.g., unit (shoe) soles, characterized by specific gravities in the range approximating 0.4 to about 0.7 gm/cm$^3$ and a favorable combination of properties as aforesaid (compared with conventional elastomers of equivalent specific gravities heretofore produced in the industry) can be prepared by reacting (a) unique normally-liquid quasi-polyether prepolymers, (b) an ethylene oxide capped polyether polyol, (c) a chain extender, and (d) blowing agent(s), optionally (e) in the presence of polymer particles that are stably dispersed in said polyether polyol (b) above or in said quasi-polyether prepolymer (a) above or in both (b) and (a), desirably in the presence of a catalyst and cell regulating agent and optionally, known additives such as surface active agents, dyes, etc.

The polyisocyanates used in the preparation of the unique normally-liquid quasi-polyether prepolymers, as will be further developed and described hereinafter, preferably are a mixture of (a) a normally-solid diphenylmethane diisocyanate (MDI), in particular 4,4'- and/or 2,4'-diphenylmethane diisocyanate which are solid at room temperature plus minor quantities of (b) the carbodiimide of MDI, or the carbodiimide of tolylene diisocyanate (TDI), and/or mixtures thereof, and/or (c) the corresponding uretone imine triisocyanate of MDI, or the corresponding uretone imine triisocyanate of TDI, and/or mixtures thereof.

In various aspects of the invention there is present a stable dispersion of polymer in the liquid polyol reactant (preferred) and/or liquid quasi-prepolymer reactant. Suitable polymer dispersion include the polymer/polyether polyols such as described in U.S. Pat. Nos. 3,304,273 and 3,383,351 to Stamberger and in U.S. Pat. No. 4,042,537 to Dahm; the polymer/quasi-polyether prepolymers obtained by the reaction of polymer/polyether polyols with the above polyisocyanate mixture comprising the isocyanate compound, carbodiimide and/or uretone imine; or the polymer/quasi-polyether prepolymers resulting from the reaction of a polymer dispersion in said polyisocyanate mixture with normal polyether polyols and/or polymer/polyether polyols following the procedures of U.S. Pat. No. 4,283,500 to Armstrong et al. The foregoing U.S. Pat. Nos. 3,304,273; 3,383,351; 4,042,537; and 4,283,500 are hereby incorporated by reference into this disclosure as if set out herein in full text.

The term "normal polyether polyols", as used in this specification, indicates that such polyols do not contain particles of polymer dispersed therein. The term "polymer/polyether polyol", as used herein, refers to a stable dispersion of polymer in the polyether polyol. The form of the polymer particles is so fine that essentially no sedimentation occurs even after long standing. Compatible mixtures of normal polyether polyols, of polymer/polyether polyols, and of both types of polyols are included within the scope of the invention. The polyether polyol(s) can be termed a poly(oxyethyleneoxypropylene)polyol(s) which is discussed and characterized in greater detail at a later section. The polymer/polyether polyols preferably include (1) polyols which are obtained by the polymerization reaction of ethylenic monomer(s), e.g., acrylonitrile, in a medium of normal polyether polyol as well as (2) polyols which are obtained by the polyaddition reaction of an isocyanate compound, e.g., tolylene diisocyanate, with a polyamine compound and/or a hydrazine compound and/or a hydrazide compound such as triethylenediamine, hydrazine, hydrazine hydrate, etc., in a medium of normal polyether polyol. Reaction (1) above results in a liquid, stable polymer/polyether polyol mixture presumably characterized by some graft and/or block polymer on the polyether backbone; see U.S. Pat. Nos. 3,304,273 and 3,383,351 to Stamberger. Reaction (2) results in a stable dispersion of polyureas or polyhydrazodicarbonamides in the normal polyether polyol as described by Dahm in U.S. Pat. No. 4,042,537. Though reaction (1) is a polymerization reaction and reaction (2) is a polyaddition reaction, and physical and/or chemical differences exist between the polymer products of these two types of reaction, they have been termed herein "polymer/polyether polyols(s)" or simply "polymer/polyols(s)".

The invention, in a preferred form, provides for improved integral skin microcellular polyether polyurethane elastomers with specific gravities of from about 0.4 to 0.7 gm/cm$^3$. Such elastomers are obtained by reacting a formulation comprising:

(a) liquid quasi-polyoxyethyleneoxypropylene prepolymers having a crystalline point below about 13° C., desirably below about 10° C., preferably below about 5° C., and generally no lower than about −20° C., which result from the reaction of (1) a mixture consisting essentially of (i) a normally-solid (at room temperature) diphenylmethane diisocyanate, preferably 4,4'- and 2,4'-diphenylmethane diisocyanate, with small amounts of (ii) the carbodiimide of diphenylmethane diisocyanate, or the carbodiimide of tolylene diisocyanate, and/or mixtures thereof, and (iii) the corresponding triisocyanato uretone imine of diphenylmethane diisocyanate, or the corresponding triisocyanato uretone imine of tolylene diisocyanate or mixtures thereof; with (2) an ethylene oxide capped polyol of the group consisting of poly(oxyethyleneoxypropylene)polyols and polymer/poly(oxyethyleneoxypropylene)polyols and mixtures thereof, said ethylene oxide capped polyols having a hydroxyl equivalent weight of about 750 to about 3000, preferably from about 850 to about 2500; and preferably still from about 1000 to about 2000; a hydroxyl functionality of 2 to 3, desirably from 2 to about 2.6, preferably from about 2 to about 2.5, and preferably still from 2.0 to 2.3 (an OH functionality of 2 being highly preferred in various embodiments of the invention); an oxyethylene cap to about 10 to about 30% by weight, suitably a cap of from about 15 to about 25% by weight; an internal oxyethylene content of from 0% and upwards to 40% by weight, suitably from 0% to about 25% by weight, and in the practice of various embodiments 0% by weight (of internal oxyethylene content), the total oxyethylene content of the polyol not exceeding about 50% by weight, desirably not exceeding 10-30% by weight; and the remainder of the capped polyol consisting essentially of oxypropylene;

(b) an ethylene oxide capped polyol reactant of the group consisting of poly(oxyethyleneoxypropylene)-polyols and polymer/polyoxyethyleneoxypropylene)-polyols (preferred) and mixtures thereof (preferred), said polyol reactant being described hereinafter in more detail;

(c) a polyfunctional chain extender characterized by hydroxy groups and/or amino groups which contain amino hydrogen;

(d) said reaction taking place in the presence of a halogenated hydrocarbon blowing agent;

(e) the isocyanate index being in the range of 94 to 105; and preferably (f) in the presence of polymer particles stably dispersed in said quasi-prepolymer (a) above and/or capped polyol (b) above, the total polymer content not exceeding about 20–25% by weight, based on the total weight of the system.

It is observed that molded integral skin microcellular polyether elastomer products such as shoe soles, automotive arm rests, etc., prepared from novel multi-component systems in which a stably dispersed polymer content as low as 1 to 2% by weight, based on the total weight of the system, results in a favorable and improved combination of mechanical strength properties, such as compression modulus, tensile, tear strength, and/or abrasion resistance and the like. A practical upper limit of polymer content in the system takes into consideration the viscosity and its effect on mixing prior to introduction into the mold, phase separation due to incompatibility, and other factors. A suitable upper limit may well be as high as 20–25% by weight, and even higher, based on the weight of the system. In various embodiments of the invention, systems having a polymer content in the range of about 2–3% to about 15–18% by weight generally embraces the integral skin elastomers which are characterized by the improved physical and mechanical properties discussed herein.

In a further preferred aspect of the invention, improved integral skin microcellular polyether polyurethane elastomer articles, e.g., shoe soles, having specific gravities of from about 0.7 to about 0.4 gm/cm$^3$, preferably below 0.55 gm/cm$^3$, and preferably still from about 0.5 to about 0.4, and slightly lower, which are characterized inter alia by Shore A hardness values of about 50 to about 90, outstanding low temperature dynamic flexural properties (measured by Ross Flex, for example, at $-18°$ C.), excellent green strength, as well as a favorable combination of other mechanical properties, can be produced by reacting a formulation comprising:

(a) liquid quasi-polyoxyethyleneoxypropylene prepolymers having an NCO equivalent weight in the range of from about 200 to 280 prepared by reacting a mixture of (i) normally solid 4,4'- and/or 2,4'- and/or 2,2'- and/or 4,2'-diphenylmethane diisocyanate (MDI) and (ii) an equilibrium mixture of the diisocyanate carbodiimide of MDI and the triisocyanato uretone imine of MDI, said mixture having an NCO equivalent weight in the range of from an NCO equivalent weight of from 125.5 to 137, preferably from about 126 to 135, preferably still from 126–127 to about 130–132; with (ii) an ethylene oxide capped polyol of the group consisting of poly(oxyethyleneoxypropylene)polyols and polymer/-poly(oxyethyleneoxypropylene)polyols and mixtures thereof having the characteristics described previously;

(b) an ethylene oxide capped polyol reactant described herein;

(c) a polyfunctional chain extender described herein;

(d) said reaction taking place in the presence of a halocarbon blowing agent and at an NCO index number in the range of from 94 to 104; and preferably (e) in the presence of polymer particles stably dispersed in said quasi-prepolymer (a) above and/or capped polyol (b) above (preferred), the polymer content being upwards to about 20% by weight, suitably about 2–3 to about 15–18% by weight, based on the weight of the system.

In the manufacture of conventional microcellular polyether polyurethanes for shoe soles by means of the integral-skin fluorocarbon foaming technique it is oftentimes very difficult to fabricate parts at densities of 0.55 gm/cm$^3$ and above, even up to 0.75 gm/cm$^3$, that will not exhibit shrinkage or sink marks upon demolding from the mold cavity. The prior art has found that the addition of as little as 0.07 to 0.2% by weight of water as a blowing agent in the polyol reactant mixture, which normally includes about 6–10% by weight of the conventional fluorocarbon blowing agent, will usually eliminate the occurrence of sink or shrink marks in the density range of about 0.55 gm/cm$^3$ and above. However, the addition of the water blowing agent has certain deleterious effects. One such effect is the formation of a slightly porous surface skin that makes it difficult or nearly impossible to obtain clean-looking blemish-free surfaces when applying conventional unit sole lacquers. This is particularly difficult in the lower density range, for example, from about 0.55–0.65 gm/cm$^3$.

The addition of water as a secondary blowing agent does not circumvent shrinkage of conventional integral skin microcellular polyether polyurethanes in the density range of 0.4 up to about 0.55 gm/cm$^3$. In addition, the utilization of water as a secondary blowing agent oftentimes also results in cream lines visible on the molded part. Such lines make painting of the part difficult and are objectionable.

Very surprisingly, it has also been discovered that improved integral skin microcellular polyether elastomers can be manufactured from systems in which blowing is effected without the use of water as a secondary blowing agent, i.e., blowing is preferably effected with halocarbons, as will be discussed hereinafter. The resulting improved integral skin elastomer products have specific gravities as low as about 0.4 gm/cm$^3$ and upwards to about 0.7 gm/cm$^3$, preferably below 0.55 to about 0.4 gm/cm$^3$, and exhibit an excellent smooth surface appearance essentially devoid of blemishes and extremely suitable for painting and lacquering.

The invention, in further preferred aspects, utilizes novel normally-liquid quasi-polyether prepolymers having a crystalline point below about 13° C., desirably below about 10° C., preferably below about 5° C., and generally no lower than about $-20°$ C., in the preparation of the novel integral skin microcellular polyether polyurethanes, said quasi-polyether prepolymers being prepared by reacting (1) a mixture consisting essentially of (i) a normally-solid (at room temperature) diphenylmethane diisocyanate, preferably 4,4'- and 2,4'-diphenylmethane diisocyanate, and (ii) the carbodiimide of diphenylmethane diisocyanate or the carbodiimide of tolylene diisocyanate or mixtures thereof, and/or (iii) the corresponding triisocyanato uretone image of diphenylmethane diisocyanate or the corresponding triisocyanato uretone imine of tolylene diisocyanato or mixtures thereof; with (2) an ethylene oxide capped polyol of the group consisting of poly(oxyethyleneoxy-propylene)polyols and polymer/poly(oxyethyleneoxypropylene)polyols and mixtures thereof, said ethylene oxide capped polyols having a hydroxyl equivalent weight of about 750 to about 3000, preferably from about 850 to about 2500, and preferably still from about 1000 to about 2000; a hydroxyl functionality of 2 to 3, desirably from about 2 to about 2.6, and preferably still from about 2 to about 2.5, and preferably still from 2.0 to 2.3 (OH functionality of 2 for various embodiments of the invention being highly preferred); an oxyethylene cap to about 10 to about 30% by weight, suitably an oxyethylene cap of from about 15 to about 25% by weight; an internal oxyethylene content of from 0% and upwards to 40% by weight, suitably from 0% to about 25% by weight, and in the practice of various embodiments 0% by weight (of internal oxyethylene content), the total oxyethylene content of the polyol not exceeding about 50% by weight, desirably not exceeding 10-30% by weight; and the remainder of the capped polyol consisting essentially of oxypropylene.

The carbodiimide of MDI can be represented by the formula:

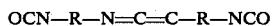

whereas the uretone imine, a trifunctional trimeric cycloadduct, can be represented by the formula:

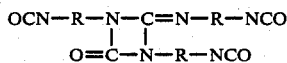

wherein each R shown above is

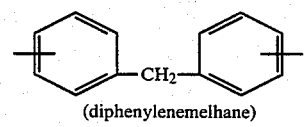

(diphenylenemelhane)

The carbodiimide of TDI can be represented by the formula:

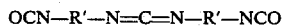

whereas the uretone imine of TDI can be represented by the formula:

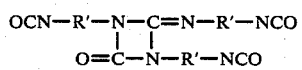

wherein each R' shown above is

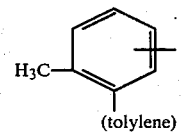

(tolylene)

Normally solid, relatively high purity 4,4'-MDI, e.g., purity of about 90% by weight and upwards to 97-98% by weight, and higher, in admixture with a minor quantity of the above-described carbodiimide(s) and/or corresponding uretone imine(s), suitably an equilibrium mixture of the carbodiimide and the uretone imine, can be characterized by their NCO equivalent weight. Suitable mixtures consisting essentially of normally solid, relatively pure 4,4'-MDI, the corresponding carbodiimide of 4,4'-MDI and/or corresponding uretone imine of 4,4'-MDI, desirably possess an NCO equivalent weight of from 125.5 and upwards to 137, preferably from about 126 to 135, preferably still from 126-127 to about 130-132.

Normally solid, relatively high purity 4,4'-MDI which is crystalline at room temperature is also desirably converted to liquid mixtures by incorporating therein relatively minor amounts, for example, up to about 15-20% by weight, and higher, desirably 2-3 to 10-12% by weight, of the diisocyanato carbodiimide of TDI and/or the triisocyanato uretone imine of TDI. Advantageously, minor amounts of TDI in a virtually inert medium of diphenylmethane diisocyanate can be selectively converted to the carbodiimide of TDI and-/or uretone imine of TDI by the catalytic process described in U.S. Pat. No. 4,294,719 to Wagner et al whereby there is obtained a liquid mixture of MDI and the diisocyanato carbodiimide and/or triisocyanato uretone imine of the TDI.

Mixtures of 4,4'-MDI and small quantities of carbodiimide of TDI and/or uretone imine of TDI which are highly desirable in the practice of various embodiments of the invention are characterized by an NCO equivalent weight in the range of from about 125.5 to about 132, preferably from about 126 to about 129-130.

It is essential for high reactivity to use capped polyols which have a relatively high percentage of primary hydroxyl groups, e.g., greater than 50-60% primary hydroxyl and upwards to 90%, preferably at least about 75%, as the polyol ingredient of the polyol resin as well as in the preparation of the novel quasi-prepolymers. To achieve these levels it will, therefore, be necessary to generally utilize at least about 10% by weight ethylene oxide as a cap for the poly(oxyethyleneoxypropylene)-polyol. There is a useful upper limit since the formation of stable polymer/polyols with relatively high ethylene oxide caps may prove commercially difficult to prepare. A cap of about 25-30% ethylene oxide is therefore believed to be a practical upper limit. Most suitably, the ethylene oxide cap represents about 10-15 to about 20-25% by weight of the capped polyol. The internal distribution of ethylene oxide in the polyol chain generally can range from 0% by weight to about 40% by weight of the capped polyol. In general, the total ethylene oxide content does not exceed 50% by weight based on the weight of the polyol. The remainder of the capped polyol consists essentially of oxypropylene. The portion of internal ethylene oxide may be randomly located in the polymer chain or it may be present as one or more blocks. It is preferred that any internal ethyleneoxy groups be distributed in random fashion in the chain.

The preparation of the normal polyether polyols can be carried out in accordance with well-known techniques comprising the reaction of the polyhydric starter being employed and the propylene and ethylene oxides in the presence of an oxyalkylation catalyst. Usually, the catalyst is an alkali metal hydroxide such as, for example, potassium hydroxide. The oxyalkylation of the polyhydric initiator may be carried out at temperatures ranging from about 90° C. to about 150° C. and usually at an elevated pressure up to about 200 p.s.i.g., employing sufficient amounts of the propylene and ethylene oxides and adequate reaction time to obtain a polyol of the desired molecular weight which is conveniently followed during the course of the reaction by standard hydroxyl number determinations. Depending upon whether random or block distribution is desired, the ethylene and/or propylene oxide reactants may be fed to the reaction system sequentially to provide chains containing respective blocks of the different oxyalkylene units or they may be fed simultaneously to provide substantially random distribution followed by appropriate capping with ethylene oxide.

Any suitable dihydric and/or trihydric initiator(s) may be employed. As illustrative examples, when forming diols, propylene glycol, water, ethylene glycol, 1,3-propanediol, dipropylene glycol, diethylene glycol, 1,4-butanediol, neopentyl glycol, aniline, tetrahydrofuran, N-methyldiethanolamine, or the like can be utilized. For the preparation of triols, glycerine, trimethylolpropane, triethanolamine, trimethylolethane, 1,2,6-hexanetriol, or the like may advantageously be employed. Other useful initiators are well-known in the art.

Polymer/polyols which are useful in the preparation of the novel normally-liquid quasi-prepolymers and preferred as reactants in the preparation of the improved integral skin microcellular elastomer products are well known in the art and commercially available. For example, the polymer/polyols may be prepared by polymerizing a vinyl monomer or monomers in situ in the normal ethylene oxide capped polyols. Any vinyl monomer may be used, and useful monomers are described in various prior patents, including U.S. Pat. Nos. 3,304,273 and 3,383,351 to Stamberger, the disclosures of which are incorporated by reference as if set out in full text herein. It is, however, preferable to use acrylonitrile, with or without a comonomer(s), e.g., methyl methacrylate, vinyl acetate, ethyl acrylate, etc., as well as acrylonitrile/styrene systems in which the acrylonitrile/styrene ratio may vary over the entire range.

Further useful polymer/polyols which are suitable in the practice of the invention(s) include stable dispersions of polyureas and polyhydrazodicarbonamides in the ethylene oxide capped polyether polyol medium. These polymer/polyols products, as indicated previously, are obtained by the polyaddition of isocyanate compounds with polyamines, hydrazines and/or hydrazides in the abovesaid normal polyol medium. The isocyanate compounds can be monoisocyanates or polyisocyanates and include acyclic, alicyclic, aromatic and heterocyclic isocyanates. Polyisocyanates are preferred. Illustrative isocyanate compounds include 2,4- and 2,6-tolylene diisocyanate (preferred), 1,3- and 1,4-phenylene diisocyanate, 4,4'- and/or 2,4'-diphenylmethane diisocyanate, 1,5-naphthalene diisocyanate, 1,6-hexamethylene diisocyanate, phenyl isocyanate and the like. Suitable polyamines include the polyvalent primary and/or secondary acyclic, alicyclic or aromatic amines such as ethylenediamine, propylenediamine, triethylenediamine, piperazine and the like. Illustrative hydrazines and hydrazides include hydrazine (preferred), hydrazine hydrate (preferred), methylhydrazine, dihydrazide, semicarbazide and the like. The preparation of the above dispersions of polyurea and/or polyhydrazodicarbonamides in the polyol medium is well known in the art and these products are commercially available. U.S. Pat. No. 4,042,537 to Dahm which exemplifies this technology is incorporated by reference into this specification as if set out in full text herein.

Liquid ethylene oxide capped polyols used as a reactant in the fabrication of the integral skin elastomer products are characterized by a hydroxyl equivalent weight of about 750 to about 3000, preferably from about 850 to about 2500, and preferably still from about 1000 to about 2250; and a hydroxyl functionality of 2 to 3, preferably from about 2.1-2.2 to about 2.8, and preferably still from about 2.3 to about 2.7.

As intimated previously, the polymer/polyol may be blended with the normal polyol to reduce the polymer content to a desired level. Blending may be feasible when relatively low amounts of polymer content are desired due to the economic penalty involved in forming polymer/polyols with such relatively low polymer content initially. It should be noted, however, that the normal polyol used for blending may effect polymer stability; it will be desirable, therefore, to select the polyol to avoid this disadvantage.

The manufacture of shoe soles of relatively high Shore A hardness, e.g., from 50-55 to 85-90, from normal polyether systems, can generally be obtained by introducing sufficient hard segments into the microcellular elastomer. This may be accomplished by increasing the amount of chain extender, e.g, ethylene glycol or 1,4-butanediol, in the resin. However, the increase in the Shore A hardness property generally results in a decrease in low temperature flexibility and cut growth resistance of the elastomer. The decrease in these physical properties appears to be attributable to a decrease in the percentage of relatively long chain (soft) segments in the elastomer. Another disadvantage becomes apparent since compatibility of the polyol/chain extender mixture in the resin decreases with increasing amounts of the short chain extender.

In the practice of certain embodiments of the invention there is provided unique multi-component systems in which Component A contains the novel quasi-poly(oxyethyleneoxypropylene) prepolymer and Component B comprises a compatible mixture of poly(oxyethyleneoxypropylene) polyol, a difunctional chain extender, and a halogenated hydrocarbon blowing agent, with the following provisos: (1) the poly(oxyethyleneoxypropylene) segment of the quasi-prepolymer (Component A) is derived from a normal ethylene oxide capped polyol and/or a polymer/ethylene oxide capped polyol; (2) the poly(oxyethyleneoxypropylene) polyol (Component B) is a normal ethylene oxide capped polyol and/or a polymer/ethylene oxide capped polyol; and preferably (3) the total polymer content of said multi-component system contains upwards to about 20-25% by weight of stably dispersed polymer, based on the weight of the system, suitably upwards to about 30-35% by weight of polymer, based on the weight of polymer/polyol, and preferably from about 2-3 to about 20-30% by weight of polymer/polyol. It is thus feasible to obtain relatively high Shore A hardness values, e.g., upwards to about 95, by providing multi-component systems with a polymer content over a relatively wide range while still maintaining superior low temperature dynamic flex and green strength properties. Moreover, these properties are achieved by employing lower chain extender levels than normally employed in the preparation of conventional integral skin microcellular polyether elastomers. Additionally, the polyol/chain extender/blowing agent incompatibility is substantially diminished or generally avoided by the practice of these embodiments.

Polyfunctional chain extenders characterized by hydroxyl groups and/or amino groups which contain amino hydrogen atoms are especially useful in the practice of the invention and include the glycols, amino alcohols, and diamines. Typical glycols are illustrated by the alkanediols of the formula HO $(CH_2)_n$ OH, wherein n is 2 to 10 or more, e.g., ethylene glycol, 1,3-propanediol, 1,4-butanediol, 1,5-pentanediol, 1,6-hexanediol, 1,10-decanediol, and the like. Other glycols that are suitable include diethylene glycol, thiodiglycol, triethylene glycol, tetraethylene glycol, p-xylylenediol, quinitol, neopentylene glycol, dihydroxyethylhydroquinone, and mixtures thereof, and the like. It is also possible to use glycols characterized by hetero atoms such as nitrogen and/or sulfur; double bonds; and bromine or other halogen atoms. These include N-methyldiethanolamine, N-t-butyldiethanolamine, di-beta-hydroxyethylaniline, triisopropanolamine, di-beta-hydroxyethyl sulfide, 2-butene-1,4-diol, 2,3-dibromo-1,4-butanediol, di-beta-hydroxyethyl-urea, and di-beta-hydroxyethyl urethane. Small amounts of higher functional compounds such as trifunctional compounds can be admixed with the difunctional chain extender, e.g., as glycerine, trimethylolpropane, trimethylolethane, 1,2,6-hexanetriol and others well known in the art.

Catalysts which can be employed for the purpose of accelerating the chemical reaction rates during the preparation of the microcellular elastomers include, by way of illustrations, the following:

(a) tertiary amines such as bis(dimethylaminoethyl) ether;

(b) tertiary phosphines such as trialkylphosphines, dialkylbenzylphosphines, and the like;

(c) strong bases such as alkali and alkaline earth metal hydroxides, alkoxides, and phenoxides;

(d) acidic metal salts of strong acids such as ferric chloride, stannic chloride, stannous chloride, antimony trichloride, bismuth nitrate and chloride, and the like;

(e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicyaldehydeimine, and the like, with various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like;

(f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

(g) salts of organic acids with a variety of metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Dialkyltin mercaptides may also be utilized. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin chloride, dioctyltin dichloride, and the like.

The tertiary amines may be used as primary catalysts for accelerating the reactive hydrogen/isocyanate reaction or as secondary catalysts in combination with one or more of the above noted metal catalysts. Metal catalysts, or combinations of metal catalysts, may also be employed as the accelerating agents, without the use of amines. The catalysts are employed in catalytically significant quantities, for example, from about 0.001 percent to about 2 percent, based on weight of the reaction mixture.

Blowing agents which can be utilized to prepare the microcellular elastomers of the present invention include the halogenated hydrocarbons, in particular, the fluorocarbons such as trichlorofluoromethane, 1,1-dichloro-1-fluoroethane, 1,1,2-trifluoro-1,2,2-trichloroethane, difluorodichloromethane, and mixtures of the same and other halogenated hydrocarbons. It is also feasible to use mixtures of low boiling hydrocarbons, ethers, and ketones with halogenated hydrocarbons. Additional blowing agents are well known in the art. In the practice of a preferred embodiment of the invention, blowing is effected in the absence of water as a secondary blowing agent and preferably in the presence of a halocarbon as a primary blowing agent thereby obtaining the advantages noted previously, e.g., integral skin microcellular polyether elastomer products exhibiting an excellent smooth surface, essentially devoid of blemishes, and extremely suitable for painting and lacquering. A very small amount of water as a secondary blowing agent may be tolerated in the system, particularly in the manufacture of integral skin microcellular polyether elastomers of high specific gravities, if so desired.

Further additives which may be used include surface active agents, cell regulating agents, stabilizers, dyes, and the like.

Examples of suitable emulsifiers include the sodium salts of castor oil sulphonates or salts of fatty acids with amines, such as diethylamine oleate or diethanolamine stearate. Alkali metal or ammonium salts of sulphonic acids, for example, of dodecylbenzenesulphonic acid or dinaphthylmethanedisulphonic acid, or of fatty acids, such as ricinoleic acid or of polymeric fatty acids, may also be used as surface active additives.

Suitable foam stabilizers include polyether siloxanes, especially those which are water-soluble. These comound are generally synthesized in such a way that a copolymer of ethylene oxide and propylene oxide is attached to a polydimethylsiloxane radical. Foam stabilizers of this type are described, for example, in U.S. Pat. Nos. 2,834,748; 2,917,480; and 2,629,308.

Cell regulating agents which are useful include the polydimethylsiloxanes having viscosities of from about 2 to about 100 centistokes at 25° C.; polyphenylmethylsiloxanes like the products described in U.S. Pat. No. 4,042,537; mineral oils, polyether polyols comprising copolymers and block copolymers of ethylene and propylene oxides; and the like. Such polyether polyols can be linear or branched copolymers and block copolymers having molecular weights of, for example, from 1000 or lower to 6000 or higher. The preferred polyether polyols are linear copolymers and block copolymers having molecular weights of from about 2000 to about 3500. They can be utilized in proportions from 1 to as high as 20 parts per 100 parts of the polyol.

Preferred cell regulating agents are the polydimethylsiloxanes having viscosities of from about 5 to about 20 centistokes at 25° C. Examples of these products include DC 200 fluids (available from Dow Corning Corporation), having viscosities of from about 5 to about 100 centistokes at 25° C., and also Dow Corning Fluid DCF-1-1630, having a viscosity of about 3.5 centistokes at 25° C. (the viscosity being an indicator of the molecular weight of these silicon fluids). DC 200 fluid 5 cs has a molecular weight of 680, 10 cs oil corresonds to 1000, 20 cs to 1600, 50 cs to 3200, and 100 cs to 5000 molecular weight.

In the utilization of the present invention(s) to manufacture integral skin microcellular polyether elastomer articles, such as shoe soles, an aspect which is highly preferred, either of two commonly employed sole making processes are satisfactory. In one process, the left and right foot soles are cast as unit soles, removed from the cast, and then attached to the shoe uppers by a suitable adhesive. In the other process, the shoe uppers, i.e., left and right foot, are presented as one mold surface and the formulation is injected into the mold cavity defined by the shoe uppers and the mold walls. In either case, the molds are closed wall molds so as to obtain the mold defined sole shape. This sole shape may not necessarily be smooth and may have built-in mold ridges such as for resiliency, cushioning, lugs for slip resistance, etc.

In either process, the typical adhesives (also called "cements") for attaching (also called "cementing") the soles to the uppers are well known. In the second process, i.e., the direct attachment, the adhesive may be the cast polyurethane minus the blowing agent which is cured with the cast foam as it cures, or it may be a different polyurethane adhesive.

In the manufacture of integral skin microcellular elastomer articles, e.g., shoe soles, typically the multi-component system is employed. Component A contains the unique normally-liquid quasi-polyether prepolymer and Component B contains a compatible blend of polyether polyol, chain extender, blowing agent, and other additives. A further Component C may contain such additives as pigments, cell regulating agent, plasticizer, etc., as in a three component system. Though the shoe manufacturer does the actual metering, mixing and dispensing of the materials on the premises, the multi-component system, tailored to meet the manufacturer's requirements, is oftentimes purchased by the manufacturer of finished unit soles and/or shoes from the systems supplier.

The novel integral skin microcellular poly(oxyethyleneoxypropylene) polyurethane elastomer products, in a preferred form, (a) consist essentially of divalent diphenylenemethane groups interconnected with divalent and trivalent oxyethyleneoxypropylene groups through urethane

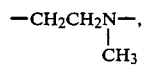

linkages, and small amounts of divalent extender groups consisting essentially of 2-6 carbon atoms and hydrogen atoms and optionally 1-2 oxy(—O—) atoms and/or 1-2 amino nitrogen atoms, said divalent extender groups being connected to said divalent diphenylenemethane groups through urethane linkages and/or ureylene

linkages; and characterized by the following properties: (b) a density below 0.55 gm/cc, preferably from about 0.4 to 0.55 gm/cc, and preferably still from about 0.4 to about 0.5 gm/cc; (c) Shore A hardness of from 50-90, preferably from about 50-85, preferably still from about 55-85, ASTM-2230; (d) 0% cutgrowth ($-20°$ C.) at $10^3 \times 100$ cycles, ASTM-1052; (e) excellent green strength at a demold time of 2.5 minutes characterized in that said integral skin microcellular product in the form of a $6'' \times 8'' \times 0.25''$ molded plaque is capable of withstanding a 180 degree bend without development of visual surface cracks at the bend of said plaque; (f) Tabor abrasion loss at 5000 cycles of less than about 500 mg, preferably less than about 350 mg, and preferably still less than about 250 mg, ASTM-D-3389; and (g) a resilient microcellular core of substantially uniform density and an integrally formed, tough continuous surface skin, said core and said skin being characterized by an abrupt change in density, said skin having an average thickness in the range of from about 0.25 to 3 mm, preferably about 0.3 to 2.5 mm, and preferably still about 0.4 mm to 2 mm.

Highly desirable divalent extender groups which characterize the novel integral skin elastomer products include the $C_2$-$C_6$alkylenes, in particular, the —$CH_2CH_2$— and —$CH_2CH_2CH_2CH_2$— groups; the $C_2$-$C_6$oxaalkylenes such as the —$C_2H_4OC_2H_4$— group; and the azaC$_2$-C$_6$alkylenes such as

and the like.

DESCRIPTION OF TEST METHODS

The following test methods have been used to determine physical properties. The description found in the appropriate ASTM manual applies except as noted below:

Tear Strength

Determined in accordance with ASTM D-624. Die C.

Tensile Strength and Elongation

Determined in Accordance with ASTM D-412. Method A.

Flex Testing

Determined in accordance with ASTM D-1052.

Taber Abrasion Loss

Determined in accordance with ASTM-D-3389, test equipment of Tabor Instrument Co., North Tonawanda, N.Y. A specimen of the novel integral skin microcellular elastomer in the shape of a disc ($4\frac{1}{2}''$ in diameter and $\frac{1}{4}''$ or $\frac{1}{2}''$ thickness) is first conditioned (pre-abraded) for 1000 cycles at room temperature using Wheel H-22. The specimen is then cleaned of abraded particles, weighed, again subjected to abrasion for 5000 cycles at room temperature using Wheel H-22. The abraded material is weighed and expressed as milligrams (mg) of specimen loss through the abrasion operation. The cycle speed of the wheel is 70±1 revolutions per minute. A vertical force or weight of 1000 grams is imposed on the arm of the abrader.

Hardness

Determined in accordance with ASTM D-2240, Durometer Shore A.

Viscosity

Determined with a Brookfield viscometer (Brookfield Engineering Laboratories, Inc.) in accordance with ASTM D-2849.

Acid Number

Determined in accordance with ASTM D-2849.

% H$_2$O

Determined in accordance with ASTM D-2849.

% NCO

Determined according to Method A described by Upjohn Polymer Chemicals in the Technical Bulletin 103 entitled "PAPI Analysis Procedures".

Specific Gravity

Determined by use of a chain gravitometer-type balance. Troemner Model S-100, which utilizes a thermometer-Plummet, with thermometer graduated from 10° C. and 10 g displacement at 20° C. Expressed as gm/cc.

Hydroxyl Number

Determined in accordance with ASTM D-2849, Method C. The hydroxyl number is determined by, and defined as, the number of milligrams of potassium hydroxide required for the complete neutralization of the hydrolysis product of the fully acylated derivative prepared from one gram of polyol or mixture of polyols. The hydroxyl number is also defined by the following equation which reflects its relationship with the functionality and molecular weight of the polyol reactant:

$$OH = \frac{56.1 \times 100 \times f}{M.W.}$$

wherein
OH = hydroxyl number of the polyol;
f = average functionality, that is, average number of hydroxyl groups per molecule of polyol; and
M.W. = average molecular weight of the polyol.

Hand Foams

Hand foams are prepared by weighing all the ingredients of the polyol component (e.g., polyol(s), extender(s), surfactant(s), catalyst(s), blowing agent(s), etc.) as required, into a polyethylene lined paper cup. These ingredients are then mixed well. The required amount of quasi-prepolymer is then added into the polyol component and mixed at high speed for 8 to 10 seconds. The mixture is then cast into a clean cup or a mold as required.

In the tables herein, the following terms of art which are being used are defined below:

| | |
|---|---|
| Cream Time: | The time interval between the final mixing and the point at which the mixture turns creamy or cloudy and starts to expand. |
| Rise Time: | The time interval between the liquid mixture poured into the container (mold) and the completion of expansion of the foaming mass. |
| Tack Free Time: | The time interval between pouring the liquid mixture and the time that the surface of the foam can be touched with a finger without sticking. |
| Snap Time: | When the reacted polymer can no longer be separated when pinched between two fingers and pulled. |
| Free Blowing Density: | The density in lbs./ft.$^3$ of a foam that is allowed to rise in an open cup and is determined by cutting the cap of the foam flush with top of the cup and using the following equation: $$\frac{\text{Weight of foam and cup in gms} - \text{Weight of cup in gms}}{\text{Volume of cup in cc}} = \text{gm/cc}$$ |
| Molded Density: | The molded density is expressed in terms of grams per cubic centimeter (gm/cc.), and is measured on the molded item by means of volume displacement with a liquid. |

Inasmuch as a number of components employed in the practice of the invention have been identified by their trade names, for the sake of convenience, these are tabulated herein and their chemical structure or tabulated herein and their chemical structure or specifications further amplified so that any of these components can be readily obtainable or made by those of ordinary skill in the art. The components are marked with a double asterisk (**) in the Examples.

| TRADE NAME DESIGNATION TABLE | |
|---|---|
| Trade Designation | Identification of Component(s) and source of same |
| ISONATE 125M Isocyanate | THE UPJOHN COMPANY. A high-purity grade of diphenylmethane diisocyanate containing approximately 98% 4,4'-diphenylmethane diisocyanate and 2% 2,4'-diphenylmethane diisocyanate. The average isocyanate equivalent weight is 125. |
| ISONATE 143L Isocyanate | THE UPJOHN COMPANY A liquid mixture of 4,4'-diphenylmethane diisocyanate, its carbodiimide, and/or its trifunctional cycloadduct. The isocyanate equivalent weight is 144; the NCO content is 29.3% by weight. The liquid mixture crystallizes below 16°-18° C. |
| RUBINATE 44 Isocyanate | RUBICON CHEMICALS, INC. Essentially pure 4,4'-diphenylmethane diisocyanate; NCO equivalent weight is 125. |
| RUBINATE LF-168 Isocyanate | RUBICON CHEMICALS, INC. Carbodiimide-modified 4,4'-diphenylmethane diisocyanate; NCO equivalent weight is about 144. |
| AIRFLEX 100 Isocyanate | PLAS-TECH SYSTEMS, INC. Quasi-prepolymer of 4,4'-diphenylmethane diisocyanate and di/tripropylene glycols having an NCO content of about 23.0% by weight, and an NCO equivalent weight of about 185. The product crystallizes at 18-20° C. |
| PPG-2025 | UNION CARBIDE CORPORATION A polyoxypropylene glycol having a molecular weight of about 2000 and a |

TRADE NAME DESIGNATION TABLE -continued

| Trade Designation | Identification of Component(s) and source of same |
|---|---|
| NIAX POLYOL 12-56 | hydroxyl equivalent weight of about 1000. UNION CARBIDE CORPORATION A poly(oxypropyleneoxyethylene) glycol having a molecular weight of about 2000, a hydroxyl equivalent weight of about 1000, an average hydroxyl number of 56, and an ethylene oxide content of about 30% by weight. The ethyleneoxy units are predominantly end-capped. |
| NIAX POLYOL E-351 | UNION CARBIDE CORPORATION A poly(oxypropyleneoxyethylene) glycol having a molecular weight of about 2800, an ethyleneoxy end cap of about 15% by weight, an average hydroxyl number of 40, and a hydroxyl equivalanet weight of about 1400. |
| NIAX POLYOL 24-32 | UNION CARBIDE CORPORATION A polymer polyol comprising about 80% by weight of E-351 and 10% by weight each, of styrene and acrylonitrile as a vinyl polymer thereof. This polymer diol has a molecular weight of about 3500, a hydroxyl equivalent weight of about 1750, and an average hydroxyl number of 32. |
| NIAX POLYOL 34-28 | UNION CARBIDE CORPORATION A polymer polyol comprising about 80% by weight of a glycerine-started poly(oxypropyleneoxyethylene)triol having about 15% by weight ethyleneoxy end caps, an average hydroxyl number of 28, a hydroxyl equivalent weight of about 2000, and 10% by weight each, of styrene and acrylonitrile as a vinyl polymer thereof. |
| NIAX POLYOL E-515 | UNION CARBIDE CORPORATION 156 A polymer polyol comprising about 70% by weight of a poly(oxypropyleneoxyethylene)/polyol, 20% by weight of styrene and 10% by weight of acrylonitrile as a vinyl polymer thereof, and having a hydroxyl equivalent weight of about 2550. |
| NIAX POLYOL 11-27 | UNION CARBIDE CORPORATION High primary hydroxyl-containing poly(oxyethyleneoxypropylene)triol/diol mixture containing about 15% by weight of ethyleneoxy units as end caps, a hydroxyl number of about 27, and a hydroxyl equivalent weight of about 2050. |
| POLY-G 55-37 | OLIN CORPORATION A poly(oxypropyleneoxyethylene) glycol having a molecular weight of about 3000, an ethylene oxide content of about 50% by weight, a portion of the ethylene oxide therein copolymerized with propylene oxide, and the balance present as ethyleneoxy end caps, and possessing a hydroxyl equivalent weight of about 1500. |
| PLURACOL 1003 | BASF-WYANDOTTE A polymer polyol comprising about 80% by weight of a poly(oxypropyleneoxyethylene)triol having about 15% by weight ethyleneoxy end caps, and 20% by weight of a mixture of styrene and acrylonitrile as a vinyl polymer, and having a hydroxyl equivalent weight of about 2000. |
| PLURACOL WUC-25230 | BASF-WYANDOTTE High primary hydroxyl-containing poly(oxyethyleneoxypropylene)triol/diol mixture containing approximately 15% by weight of ethyleneoxy units as end caps, a hydroxyl number of about 27, and a hydroxyl equivalent weight approximating 2000. |
| VORANOL 4701 | DOW CHEMICAL COMPANY A glycerine-started poly(oxypropyleneoxyethylene)triol in which the ethylene oxide is incorporated as end caps (about 15% by weight), and having a hydroxyl equivalent weight of about 1650. |
| CARPOL 2040 | CARPENTER CHEMICAL COMPANY A poly(oxypropyleneoxyethylene) diol having a molecular weight of about 2000, a hydroxyl equivalent weight of about 1000, and containing about 40% by weight of oxyethylene units. Said units are partially internal copolymers with oxypropylene units and partially oxyethylene end caps. |
| CARPOL 2050 | CARPENTER CHEMICAL COMPANY A poly(oxypropyleneoxyethylene) diol having a molecular weight of about 2000, a hydroxyl equivalent weight of about 1000, and containing about 50% by weight of oxyethylene units, said units are partially internal copolymers with oxypropylene units and partially oxyethylene end caps. |
| L-5302 Surfactant | UNION CARBIDE CORPORATION A polyoxyalkylene-polysiloxane surfactant having a specific gravity of 1.02 at 25/25° C., and a viscosity of 850 cs at 25° C. |
| L-5303 Surfactant | UNION CARBIDE CORPORATION A polyoxyethylene-polysiloxane surfactant having a specific gravity of 1.02 at 25/25° C., and a viscosity of 300 centistokes (cs) at 25° C. |
| L-5305 Surfactant | UNION CARBIDE CORPORATION A polyoxyethylene-polysiloxane surfactant having a specific gravity of 1.06 at 25/25° C., and a viscosity of 150 cs at 25° C. |
| L-5307 Surfactant | UNION CARBIDE CORPORATION A polyoxyethylene-polysiloxane surfactant having a specific gravity of 0.995 at 25/25° C., and a viscosity of 175 cs at 25° C. |
| L-5309 Surfactant | UNION CARBIDE CORPORATION A polyoxyethylene-polysiloxane surfactant having a specific gravity of 1.00 at 25/25° C., and a viscosity of 225 cs at 25° C. |
| L-6202 Surfactant | UNION CARBIDE CORPORATION A polyoxyethylene-polyoxypropylene-polydimethylsiloxane surfactant having a specific gravity of 1.03 at 25/25° C., and a viscosity of 1300 cs at 25° C. |
| L-520 Surfactant | UNION CARBIDE CORPORATION A poly(oxyethyleneoxypropylene)-polysiloxane surfactant having a specific gravity of 1.03 at 25/25° C., and a viscosity of 1100 cs at 25° C. |
| L-540 Surfactant | UNION CARBIDE CORPORATION A polyoxyethylene-polyoxypropylene-polydimethylsiloxane surfactant having a specific gravity of 1.02 at 25/25° C., and a viscosity of 1200 cs at 25° C. |
| L-548 Surfactant | UNION CARBIDE CORPORATION A polyoxyethylene-polyoxypropylene-polydimethylsiloxane surfactant having a specific gravity of 1.03 at 25/25° C., and a viscosity of 1250 cs at 25° C. |

TRADE NAME DESIGNATION TABLE -continued

| Trade Designation | Identification of Component(s) and source of same |
|---|---|
| L-550 Surfactant | UNION CARBIDE CORPORATION A polyoxyethylene-polyoxypropylene-polydimethylsiloxane surfactant having a specific gravity of 1.03 at 25/25° C., and a viscosity of 1800 cs at 25° C. |
| L-5710 Surfactant | UNION CARBIDE CORPORATION A polyoxyethylene-polyoxypropylene-polydimethylsiloxane surfactant having a specific gravity of 1.040 at 25/25° C., and a viscosity of 1200 cs at 25° C. |
| L-5720 Surfactant | UNION CARBIDE CORPORATION A polyoxyethylene-polyoxypropylene-polydimethylsiloxane surfactant having a specific gravity of 1.033 at 25/25° C., and a viscosity of 1200 cs at 25° C. |
| SURFACTANT 191 | DOW CORNING CORPORATION A polyoxyalkylene-polysiloxane surfactant. |
| SURFACTANT 196 | DOW CORNING CORPORATION A polyoxyalkylene-polysiloxane surfactant. |
| NIAX A-1 Catalyst | UNION CARBIDE CORPORATION A liquid blend catalyst consisting of 70% by weight of bis(dimethylaminoethyl) ether and 30% by weight dipropylene glycol. |
| DABCO 33-LV Catalyst | AIR PRODUCTS & CHEMICALS, INC. A liquid blend catalyst consisting of one third by weight of 1,4-diazobicyclo[2.2.2]octane and two thirds by weight dipropylene glycol. |
| DABCO EG Catalyst | AIR PRODUCTS & CHEMICALS, INC. A liquid blend catalyst consisting of one third by weight of 1,4-diazobicyclo[2.2.2]octane and two thirds by weight ethylene glycol. |
| POLYCAT 60 Catalyst | ABBOTT LABORATORIES CORPORATION Active Ingredient Above 98% Specific Gravity 0.92 at 20° C. Freezing Point Thick oil @ −20° C.; Immobile @ −50° C. Boiling Range 147°–148° C. Viscosity (Brookfield) 23 cp at 25° C. Vapor Pressure 0.10 ps at 100° F. pH 11.5 (10% aqueous solution) |
| POLYCAT SA-102 | ABBOTT LABORATORIES CORPORATION A salt comprising 51% by weight 1,8-diazabicyclo[5.4.0]undecene-7, and 49% by weight 2-ethylhexanoic acid. |
| UL-1 | WITCO CHEMICAL CORP. ORGANICS DIVISION A dibutyltin sulfide dissolved in a plasticizer. |
| CS-601 | PLAS-TECH SYSTEMS, INC. A dialkyltin sulfide complex dissolved in a plasticizer. |
| CS-604 | PLAS-TECH SYSTEMS, INC. A dibutyltin sulfide dissolved in a plasticizer. |
| DMS | A low molecular weight polydimethylsiloxane having a viscosity of 3.5 cs at 25° C., and a specific gravity of 0.916 at 25/25° C. |
| FREON 11A | E. I. duPONT deNEMOURS, INC. A stabilized version of trichlorofluoromethane. |
| BROWN PIGMENT | BI-ANGLE CHEMICAL CO., INC. About 40% by weight brown pigment in polyoxyalkylene ether polyol, further designated as Peanut 0-207-2BSP. |
| PIGMENT WHITE 3100 | PIGMENT DISPERSIONS, INC. A titanium dioxide pigment dispersed in a low molecular weight polyester diol (about 40% by weight solids). |

The following Examples are illustrative of the invention but are not to be construed as to limiting the scope thereof in any manner. In the specification, the following should be noted:

Room temperature refers to a temperature of 20° C.–23° C. unless a different temperature is indicated.

Percent refers to percent by weight unless indicated otherwise.

Parts refers to parts by weight unless indicated otherwise.

MDI refers to diphenylmethane diisocyanate. 4,4'- and/or 2,4'- and/or 2,2'- and/or 4,2'-MDI refers to 4,4'- and/or 2,4'- and/or 2,2'- and/or 4,2'-diphenylmethane diisocyanate.

TDI refers to tolylene diisocyanate. 80/20 TDI refers to an isomeric mixture of 80 parts of 2,4-tolylene diisocyanate and 20 parts of 2,6-tolylene diisocyanate.

PU Foam refers to polyurethane foam.

Index refers to NCO index number.

pli refers to pounds per linear inch.

As used herein including the appended claims, reference to a "compatible liquid polyol resin" or "compatible liquid mixture of ingredients comprising the polyol resin", or language indicating such text, shall mean that the polyol resin package which includes the polyol, chain extender, blowing agent, and generally the catalyst and other additives, if desired, is a stable, homogeneous liquid blend at room temperature, or if not compatible at room temperature the polyol resin is a compatible, stably dispersed liquid blend prior to its introduction into the mixing chamber of the dispenser. Compatible, liquid polyol resins which can be utilized in the practice of preferred aspects of the invention include relatively minor amounts of chain extenders, e.g., small amounts generally ranging from about 5 to 13% by weight of extender based on the weight of the total polyol resin side.

EXAMPLE 1

A quasi-prepolymer was prepared by reacting 200 gms of PPG-2025 with 300 gms of Isonate 125M at 60°–70° C., for 3 hours under an atmosphere of dry nitrogen. The reaction procedure comprised charging molten Isonate 125M to a reaction flask equipped with agitator, nitrogen inlet tube, dropping funnel and condenser. Heating was accomplished by means of an electric heating mantle. The molten Isonate 125M was heated to 55°–60° C., whereupon PPG-2025 was added thereto, the reaction temperature being held between 60°–70° C. After completion of the PPG-2025 addition, the reactants were further heated at 60°–70° C. for 3 hours. The resulting quasi-polyether prepolymer product was found to contain 18.5% NCO, corresponding to an isocyanate equivalent weight of 227. The warm quasi-prepolymer fluid was transferred to a glass container. Next day, the quasi-polyether prepolymer product was found to have crystallized at room temperature.

The material became homogeneous by heating in an air circulating oven at 65° C. This quasi-prepolymer product is designated as Prepolymer 1.

EXAMPLE 2

In the manner described in Example 1, there were reacted 200 gms of PPG-2025, and a mixture of 240 gms of Isonate 125M and 30 gms of Isonate 143L**. The resulting quasi-polyether prepolymer was found to contain 18.6% NCO, corresponding to an isocyanate equivalent weight of 226. The product was still liquid at room temperature after a period of 3 weeks. It is designated as Prepolymer 2.

EXAMPLE 3

In the manner described in Example 1, there were reacted 200 gms of Niax Polyol 12-56, 240 gms of Isonate 125M and 30 gms of Isonate 143L**. The resulting quasi-polyether prepolymer was found to contain 18.3% NCO, corresponding to an isocyanate equivalent weight of 230. The product remained liquid for several months at room temperature. It is designated as Prepolymer 3.

EXAMPLE 4

In an analogous manner described as Example 1, there were reacted 200 gms of Niax Polyol E-351, 200 gms of Isonate 125M, and 30 gms of Isonate 143L**. The resulting quasi-polyether prepolymer was found to contain 18.7% NCO, corresponding to an isocyanate equivalent weight of 225. The product was still liquid after a period of 3 months at room temperature. It is designated as Prepolymer 4.

EXAMPLE 5

In an analogous manner as described in Example 1, there were reacted 200 gms of Poly-G 55-37, 240 gms of Isonate 125M, and 30 gms of Isonate 143L**. The resulting quasi-polyether prepolymer was found to contain 18.6% NCO, corresponding to an isocyanate equivalent weight of 226. The product remained liquid for 3 months at room temperature until its use in subsequent foaming experiments. It is designated as Prepolymer 5.

EXAMPLE 6

In an analogous manner described in Example 1, there were reacted 200 gms of Voranol 4701, 240 gms of Isonate 125M, and 30 gms of Isonate 143L**. The resulting quasi-polyether prepolymer was found to contain 18.8% NCO, corresponding to an isocyanate equivalent weight of 223. The product was still liquid after 5 months at room temperature until employed in subsequent foaming experiments. It is designated as Prepolymer 6.

EXAMPLE 7

In an analogous manner described in Example 1, there were reacted 200 gms of Carpol 2040, 200 gms of Isonate 125M, and 30 gms of Isonate 143L**. The resulting quasi-polyether prepolymer was found to contain 18.4% NCO, corresponding to an isocyanate equivalent weight of 228. The product remained liquid for 3 months at room temperature until its use in subsequent foaming experiments. It is designated as Prepolymer 7.

EXAMPLE 8

In an analogous manner as described in Example 1, there were reacted 200 gms of Carpol 2050, 200 gms of Isonate 125M, and 30 gms of Isonate 143L**. The resulting quasi-polyether prepolymer was found to contain 18.3% NCO, corresponding to an isocyanate equivalent weight of 230. The product remained liquid at room temperature until its use about 3 months later. It is designated as Prepolymer 8.

EXAMPLE 9

In an analogous manner as described in Example 1, there were reacted 200 gms of NIAX Polyol 11-27, 240 gms of Isonate 125M and 30 gms of Isonate 143L**. The resulting liquid quasi-polyether prepolymer was found to contain 18.6% NCO, corresponding to an isocyanate equivalent weight of 226. It is designated as Prepolymer 9.

EXAMPLE 10

In an analogous manner as described in Example 1, there were reacted 200 gms of Niax Polyol E-351, 360 gms of Isonate 125M, and 40 gms of Isonate 143L**. The resulting quasi-polyether prepolymer was found to contain 20.4% NCO, corresponding to an isocyanate equivalent weight of 206. The product was clear and liquid after a period of 6 months at room temperature. It is designated as Prepolymer 10.

EXAMPLE 11

In an analogous manner as described in Example 1, there were reacted 200 gms of NIAX Polyol E-351, 180 gms of Isonate 125M, and 20 gms of Isonate 143L**. The resulting quasi-polyether prepolymer was found to contain an NCO content of 15.1%, corresponding to an isocyanate equivalent weight of 278. The product was found to remain liquid at a temperature of 15°–25° C. for a period in excess of one year and exhibit no sign of dimer and trimer formation. It is designated as Prepolymer 11.

EXAMPLE 12

Preparation of Microcellular Elastomers from Prepolymers 1-11 Supra

Microcellular elastomers were prepared from each of Prepolymers 1-11 of Examples 1-11 supra. For this purpose the following polyol blend (polyol resin) was employed.

| Ingredients | Wt. (gms) | Equivalent of OH |
|---|---|---|
| Niax Polyol 11-27** | 75 | 0.0366 |
| Niax Polyol 34-28** | 25 | 0.0125 |
| 1,4-Butanediol | 12.0 | 0.2667 |
| Diethanolamine | 0.50 | 0.0143 |
| Dabco 33-LV** | 0.60 | 0.0060 |
| Polycat 60** | 0.30 | — |
| UL-1** | 0.05 | — |
| L-5307** | 1.50 | — |
| Freon 11A** | 13.0 | |
| TOTAL | 127.95 | 0.366 |

Each of Prepolymers 1 through 11 supra (0.366 NCO equivalent) were individually foamed with the above polyol resin (0.366 OH equivalent). In the case of Prepolymer 1, which was solid at room temperature, said Prepolymer 1 was heated to 65° C. in an air circulating oven until it was homogeneous. The resulting slightly milky-looking product was allowed to cool to 30° C. before it was added for foaming with the polyol resin.

The foam ingredients were mixed vigorously at 1500 rpm in a paper cup lined with a polyethylene film, and the foam was allowed to expand. Results are recorded in Table I below:

TABLE I

| Quasi-Prepolymer | Observations |
|---|---|
| Prepolymer 1 | Resulting foam was cheesy, did not cure well, and exhibited some shrinkage. |
| Prepolymer 2 | Resulting foam was cheesy, did not cure well, and exhibited some shrinkage. |
| Prepolymer 3 | Excellent open-celled microcellular elastomer. Free-blow density 0.15 gm/cc. |
| Prepolymer 4 | Excellent open-celled foam. Free-blow density 0.14 gm/cc. |
| Prepolymer 5 | Good open-celled foam. Free-blow density 0.16 gm/cc. |
| Prepolymer 6 | Good open-celled foam. Free-blow density 0.14 gm/cc. |
| Prepolymer 7 | Good open-celled foam. Free-blow density 0.15 gm/cc. |
| Prepolymer 8 | Good open-celled foam. Free-blow density 0.16 gm/cc. |
| Prepolymer 9 | Excellent open-celled foam. Free-blow density of 0.14 gm/cc. |
| Prepolymer 10 | Good open-celled foam. Free-blow density of 0.14 gm/cc. |
| Prepolymer 11 | Excellent open-celled foam. Free-blow density of 0.16 gm/cc. |

The foams made made from Prepolymers 3-11 resulted in good to excellent integral skin microcellular foams exhibiting no shrinkage. All the quasi-prepolymers that gave operable results contain ethyleneoxy endblocks in their structure. It is believed that this results in the proper compatibility parameters for the diol extender, exhibiting proper reactivity level for good cure of the microcellular foam. Prepolymers 3-11 did not exhibit any dimer or trimer formation, although several had been prepared up to 6 months before a foam test was conducted, indicating the excellent and unexpected shelf-stability of these products. With the quasi-polyether prepolymers of the prior art it has been very difficult to obtain open-cell, non-shrinking integral skin microcellular foams at densities below 0.55 gm/cc without the use of cell opening agents such as polydimethylsiloxanes, paraffin oils and the like. Such cell opening agents render the operating conditions too critical and narrow for the production of consistently small uniform cell size. In contrast thereto, novel integral skin microcellular foamed products described herein (note, for example, Examples 3-11) exhibit unusually small and uniform cell size and possess surprisingly excellent mechanical properties.

EXAMPLES 13-24

Eleven quasi-polyether prepolymers from Niax Polyol E-351, Rubinate 44 and Rubinate LF-168** were prepared in the manner described in Example 1 supra. An additional quasi-prepolymer was also prepared without the use of Rubinate LF-168. Various properties of the resulting quasi-prepolymers were then determined, i.e., % NCO, viscosity, specific gravity, temperature at which quasi-prepolymer begins to crystallize, and NCO equivalent weight. The data are set forth in Table II infra.

TABLE II

| FORMULATION[c] | Examples 13-24 | | | | | | | | | | | |
|---|---|---|---|---|---|---|---|---|---|---|---|---|
|  | 13[a] | 14 | 15 | 16 | 17 | 18 | 19 | 20 | 21 | 22 | 23 | 24 |
| Niax Polyol E-351** | 40 | 40 | 40 | 40 | 40 | 40 | 40 | 40 | 40 | 40 | 40 | 40 |
| Rubinate 44** | 60 | 57 | 54 | 51 | 48 | 45 | 42 | 39 | 36 | 30 | 15 | 0 |
| Rubinate LF-168** | 0 | 3 | 6 | 9 | 12 | 15 | 18 | 21 | 24 | 30 | 45 | 60 |
| % by Wt LF-168 in Total isocyanate | 0 | 5 | 10 | 15 | 20 | 25 | 30 | 35 | 40 | 50 | 75 | 100 |
| NCO Equivalent Weight | 125 | 126 | 126.9 | 127.9 | 128.8 | 129.8 | 130.7 | 131.7 | 132.6 | 134.5 | 139.3 | 144 |
| PHYSICAL CHARACTERISTICS: QUASI-PREPOLYMERS OF NIAX POLYOL E-351** | | | | | | | | | | | | |
| % NCO Calculated | 18.87 | 18.75 | 18.63 | 18.51 | 18.39 | 18.27 | 18.00 | 17.90 | 17.71 | 17.43 | 17.07 | 16.48 |
| Found | 18.76 | 18.78 | 18.72 | 18.50 | 18.43 | 18.30 | 18.03 | 18.10 | 17.63 | 17.71 | 16.74 | 16.33 |
| Equivalent Wt/NCO | 223.9 | 223.6 | 224.4 | 227.0 | 227.9 | 229.9 | 232.9 | 232.1 | 238.2 | 241.0 | 246.1 | 257.2 |
| Viscosity, cps (23° C.) | — | 363 | 375 | 392 | 425 | 650 | 500 | 540 | 540 | 620 | 671 | 972 |
| Specific Gravity: gm/ml (23° C.) | — | 1.1278 | 1.1282 | 1.1289 | 1.1303 | 1.1304 | 1.1140 | 1.1149 | 1.1152 | 1.1187 | 1.1317 | 1.1342 |
| Onset of Crystallization (C°.) | 25 | 5 | 0 | 0 | −5 | −10 | −10 | −10 | −20 | −20 | <−20 | <−20[b] |

[a]No carbodiimide and/or uretone imine in the isocyanate reactant.
[b]Lowest temperature observed was −20° C.
[c]Parts by weight.

EXAMPLES 25-30

Five quasi-polyether prepolymers from Niax Polyol 24-32, Rubinate 44 and Rubinate LF-168** were prepared in the manner described in Example 1 supra. An additional quasi-prepolymer was also prepared without the use of Rubinate LF-168. Various properties of the resulting quasi-prepolymers were then determined, i.e., % NCO, viscosity, specific gravity, temperature at which quasi-prepolymer begins to crystallize, and NCO equivalent weight. The data are set forth in Table III infra.

TABLE III

| FORMULATION[b] | 25[a] | 26 | 27 | 28 | 29 | 30 |
|---|---|---|---|---|---|---|
| Niax Polyol 24-32** | 40 | 40 | 40 | 40 | 40 | 40 |
| Rubinate 44** | 60 | 57 | 54 | 51 | 48 | 45 |
| Rubinate LF-168** | 0 | 3 | 6 | 9 | 12 | 15 |
| % by Wt. LF-168 in Total Isocyanate | 0 | 5 | 10 | 15 | 20 | 25 |
| NCO Equivalent Weight | 125 | 126 | 126.9 | 127.9 | 128.8 | 129.8 |
| PHYSICAL CHARACTERISTICS: QUASI-PREPOLYMERS OF NIAX POLYOL 24-32** | | | | | | |
| % NCO Calculated | 19.12 | 19.01 | 18.88 | 18.77 | 18.65 | 18.53 |
| Found | 18.99 | 18.97 | 18.83 | 18.78 | 18.50 | 18.45 |
| Equivalent Wt/NCO | 221.2 | 221.4 | 223.1 | 223.6 | 227.0 | 227.6 |
| Viscosity, | — | 392 | 411 | 422 | 475 | 494 |

TABLE III-continued

| FORMULATION[b] | 25[a] | 26 | 27 | 28 | 29 | 30 |
|---|---|---|---|---|---|---|
| cps (23° C.) | | | | | | |
| Specific Gravity: gm/ml (23° C.) | — | 1.1341 | 1.1353 | 1.1363 | 1.1366 | 1.1355 |
| Onset of Crystallization (°C.) | 25 | 10 | 5 | 5 | 0 | 0 |

[a]No carbodiimide and/or uretone imine in the isocyanate reactant.
[b]Parts by weight.

EXAMPLES 31–36

Five quasi-polyether prepolymers from Niax Polyol 11-27, Rubinate 44 and Rubinate LF-168** were prepared in the manner described in Examples 1 supra. An additional quasi-prepolymer was also prepared without the use of Rubinate LF-168. Various properties of the resulting quasi-prepolymers were then determined, i.e., % NCO, viscosity, specific gravity, temperature at which quasi-prepolymer begins to crystallize, and NCO equivalent weight. The data are set forth in Table IV infra.

TABLE IV

| FORMULATION[b] | 31[a] | 32 | 33 | 34 | 35 | 36 |
|---|---|---|---|---|---|---|
| Niax Polyol 11-27** | 40 | 40 | 40 | 40 | 40 | 40 |
| Rubinate** | 60 | 57 | 54 | 51 | 48 | 45 |
| Rubinate LF-168** | 0 | 3 | 6 | 9 | 12 | 15 |
| % by Wt. LF-168 in Total Isocyanate | 0 | 5 | 10 | 15 | 20 | 25 |
| NCO Equivalent Weight | 125 | 126 | 126.9 | 127.9 | 128.8 | 129.8 |
| PHYSICAL CHARACTERISTICS: QUASI-PREPOLYMERS OF NIAX POLYOL 11-27** | | | | | | |
| % NCO Calculated | 19.26 | 19.15 | 19.03 | 18.91 | 18.80 | 18.67 |
| Found | 19.16 | 19.08 | 18.83 | 18.77 | 18.71 | 18.51 |
| Equivalent Wt/NCO | 219.2 | 220.1 | 223.1 | 223.8 | 224.5 | 226.9 |
| Viscosity, cps (23° C.) | — | 437 | 450 | 483 | 507 | 530 |
| Specific Gravity: gm/ml (23° C.) | — | 1.1275 | 1.1281 | 1.1285 | 1.288 | 1.1290 |
| Onset of Crystallization (°C.) | 25 | 10 | 5 | −5 | 5 | 0 |

[a]No carbodiimide and/or uretone imine in the isocyanate reactant.
[b]Parts by weight.

EXAMPLES 37–42

Five quasi-polyether prepolymers from Niax Polyol 34-28, Rubinate 44 and Rubinate LF-168** were prepared in the manner described in Example 1 supra. An additional quasi-prepolymer was also prepared without the use of Rubinate LF-168. Various properties of the resulting quasi-prepolymers were then determined, i.e., % NCO, viscosity, specific gravity, temperature at which quasi-prepolymer begins to crystallize, and NCO equivalent weight. The date are set forth in Table V infra.

TABLE V

| FORMULATION[b] | 37[a] | 38 | 39 | 40 | 41 | 42 |
|---|---|---|---|---|---|---|
| Niax Polyol 34-28** | 40 | 40 | 40 | 40 | 40 | 40 |
| Rubinate 44** | 6 | 57 | 54 | 51 | 48 | 45 |
| Rubinate LF-168** | 0 | 3 | 6 | 9 | 12 | 15 |
| % by Wt. LF-168 in Total Isocyanate | 0 | 5 | 10 | 15 | 20 | 25 |
| NCO Equivalent Weight | 125 | 126 | 126.9 | 127.9 | 128.8 | 129.8 |
| PHYSICAL CHARACTERISTICS: QUASI-PREPOLYMERS OF NIAX POLYOL 34-28** | | | | | | |
| % NCO Calculated | 19.24 | 19.12 | 19.00 | 18.88 | 18.77 | 18.64 |
| Found | 19.11 | 19.00 | 18.83 | 18.73 | 18.50 | 18.33 |
| Equivalent Wt/NCO | 219.8 | 221.1 | 223.1 | 224.2 | 227.0 | 229.1 |
| Viscosity, cps (23° C.) | — | 543 | 573 | 615 | 643 | 694 |
| Specific Gravity: gm/ml (23° C.) | — | 1.1355 | 1.1388 | 1.1390 | 1.1392 | 1.1379 |
| Onset of Crystallization (°C.) | 25 | 10 | 10 | 5 | 5 | 5 |

[a]No carbodiimide and/or uretone imine in the isocyanate reactant.
[b]Parts by weight.

EXAMPLES 43–61

A series of nineteen hand foam experiments were conducted with a comprehensive number of the quasi-prepolymer products described in Examples 14–24, 26–29, 32, 33, 38 and 39, in order to examine certain properties of the resulting microcellular elastomers and to judge their suitability for use as shoe soles. For this purpose, molded plaques having dimensions of 6"×8"×0.25" were prepared and examined for density, Shore A hardness, and Ross Flex properties at −18° C. (0° F.). In particular, it was shown that the foams could be molded at a density approximating 0.4–0.45 gm/cc without shrinkage. Moreover, it was shown that the low temperature Ross Flex properties of the microcellular elastomer products prepared in accordance with various aspects of the present invention are far superior to the results generally observed by the prior art. In fact, the products of the present invention are outstanding in this respect.

The molded plaques were prepared by pre-blending a polyol blend including polyether polyols, chain extenders, catalysts, surfactants, and blowing agent, and reacting said blend with the equivalent amount of the applicable quasi-prepolymers that had been prepared according to the procedures described in the abovesaid Examples. The reacting foaming mass was transferred into a preheated aluminum mold having dimensions of 6"×8"×0.25"; the properly vented mold was closed and placed into a press whose platens were preheated to about 50° C.–60° C. After several minutes, the molded plaques were removed, allowed to stand at room temperature for 2–3 days and were then examined for the physical properties listed hereinbelow.

The polyol blend comprised the following ingredients:

| INGREDIENTS | WT. IN GMS. | EQUIVALENT OF OH |
|---|---|---|
| Niax Polyol 11-27** | 25.0 | 0.0120 |
| Niax Polyol 34-28** | 25.0 | 0.0125 |
| 1,4-Butanediol | 6.0 | 0.0334 |
| Diethanolamine | 0.25 | 0.0071 |
| Dabco EG** | 0.25 | 0.0054 |
| Polycat SA-102** | 0.15 | |
| CS-604** | 0.25 | |
| L-5309** | 1.0 | |
| Freon 11A** | 6.5 | |
| TOTAL | 64.4 | 0.1704 |

Physical data are set forth in Table VI infra.

TABLE VI

| EXPERIMENT | QUASI-PREPOLYMER(a) | SPECIFIC GRAVITY (gm/cc) | HARDNESS SHORE A | Ross Flex (−18° C.) % Cutgrowth | |
|---|---|---|---|---|---|
| | | | | 150,000 CYCLES | 300,000 CYCLES |
| 43 | Example 14 | 0.44 | 56 | 0 | 0 |
| 44 | Example 15 | 0.45 | 54 | 0 | 0 |
| 45 | Example 16 | 0.45 | 54 | 40 | 100 |
| 46 | Example 17 | 0.45 | 55 | 20 | 30 |
| 47 | Example 18 | 0.45 | 52 | 90 | 180 |
| 48 | Example 19 | 0.44 | 52 | 20 | 20 |
| 49 | Example 20 | 0.44 | 51 | 40 | 150 |
| 50 | Example 21 | 0.46 | 51 | 40 | 200 |
| 51 | Example 22 | 0.45 | 50 | 60 | 250 |
| 52 | Example 23 | 0.46 | 56 | Broke at 150,000 cycles | |
| 53 | Example 24 | 0.44 | 55 | Broke at 35,000 cycles | |
| 54 | Example 26 | 0.43 | 64 | 120 | Not tested |
| 55 | Example 27 | 0.43 | 61 | 60 | Not tested |
| 56 | Example 28 | 0.44 | 60 | 80 | Not tested |
| 57 | Example 29 | 0.45 | 60 | 200 | Not tested |
| 58 | Example 32 | 0.44 | 54 | 200 | Not tested |
| 59 | Example 33 | 0.44 | 56 | 10 | Not tested |
| 60 | Example 38 | 0.44 | 63 | 100 | Not tested |
| 61 | Example 39 | 0.45 | 60 | 100 | Not tested |

(a)Quasi-Prepolymer Preparation:
See Examples 14-23 supra: Reaction Product of Niax Polyol E-351, Rubinate 44, and Rubinate LF-168.
See Examples 26-29 supra: Reaction Product of Niax polyol 24-32, Rubinate 44, and Rubinate LF-168.
See Examples 32-33 supra: Reaction Product of Niax Polyol 11-27, Rubinate 44, and Rubinate LF-168.
See Examples 38-29 supra: Reaction Product of Niax Polyol 34-28, Rubinate 44, and Rubinate LF-168.
See Example 24 supra: Reaction Product of Niax Polyol E-351 and Rubinate LF-168.

The novel molded microcellular products of Examples 43-61 exhibited excellent physical characteristics. It should be noted that all microcellular elastomers were molded at densities of 0.43-0.46 gm/cc. They exhibited outstanding Ross Flex properties at low temperatures, being far superior in this respect in comparison with the products known in the prior art. It should be further noted that the quasi-prepolymer of Example 23 (made from an isocyanate blend of 25% by weight essentially pure 4,4'-MDI and 75% by weight carbodiimide-modified 4,4'-MDI) and the quasi-prepolymer of Example 24 (carbodiimide-modified 4,4'-MDI only) exhibited inferior low temperature flex properties.

Shoe soles were molded at densities of 0.38-0.45 gm/cc with the quasi-prepolymers of Examples 14-18 utilizing the polyol blend recipe immediately preceding Table VI supra. Normal linear shrinkage of around 1.5% was observed, but no sink-marks due to any excessive shrinkage was noted. Such sink-marks are manifest at these low densities utilizing the prepolymer formulations of the prior art. In fact, prior art polyether formulations have for the most part been inoperable in the sense of preparing commercially acceptable products at densities approximating 0.4 gm/cc.

EXAMPLES 62-63

A quasi-prepolymer from 40% by weight of Niax Diol E-351, 55% by weight of Rubinate 44, and 5% by weight of Rubinate LF-168**, was prepared on a pilot plant scale at 60°-70° C. according to the procedure outlined in Example 1. Upon analysis, the product was found to contain 18.50% NCO, corresponding to an isocyanate equivalent weight of 227. This product is hereinafter designated as Prepolymer A.

In like manner, a quasi-prepolymer was prepared from 40% by weight of Niax Polyol 24-32, 55% by weight of Rubinate 44, and 5% by weight of Rubinate LF-168**. After analysis, the resulting pilot plant product also exhibited an NCo content of 18.50%, corresponding to an isocyanate equivalent weight of 227. This product is hereinafter designated as Prepolymer B.

Both quasi-prepolymers were still liquid after four months at temperatures of 10°-20° C., and showed no evidence of dimer or trimer formation, an aspect which is highly desirable for MDI prepolymers utilized in polyurethane molding technology. Prepolymer B exhibited the slight haziness which is accepted as normal with polymer polyol-derived products. This observed characteristic does not interfere with subsequent process operations. In freezing tests, both materials exhibited onset of crystallization at 0°-5° C.

EXAMPLES 64-70

A series of comparative machine foams were prepared from the above-identified Prepolymers A and B, and with a prior art prepolymer designated at Airflex 100 Isocyanate**. For this purpose, all ingredients with the exception of the Prepolymers A or B or AIRFLEX 100 Isocyanate (Formulations 64-70 of Table VII infra) were premixed to form the so-called "polyol resin" stream. The second stream consisted either of Prepolymer A, Prepolymer B, or Airflex 100 Isocyanate.

These storage-stable two-package systems, prepared in accordance with Formulations 64-70 of Table VII were foamed on a DESMA DZ-1 polyurethane casting machine which is particularly suitable for the manufacture of microcellular polyurethanes (DESMA A.G., Achim, West Germany). These machines are particularly well known in he shoe industry. The material temperatures of the "polyol resin" and isocyanate stream were held at room temperature. Mold temperatures for test plaque molds and unit sole molds were kept at around 50° C., a typical operating condition employed in the shoe industry. The data are recorded in Table VII below.

selected for athletic footwear; hence, the results are indeed surprising. At the respective densities, other mechanical properties such as tensile and tear strength are also judged good to excellent.

It has also been found that in addition to L-5309 (a low potency surfactant) others of this type such as L-5303, L-5305 and L-5307 as well as their competitive products from other manufacturers can also be employed. For still finer cell control it is also feasible to utilize low molecular weight polydimethylsiloxanes such as DMS**.

TABLE VII

| FORMULATIONS | 64 | 65 | 66 | 67 | 68 | 68[a] | 70[b] |
|---|---|---|---|---|---|---|---|
| Niax Polyol 11-27** | 100.00 | 100.00 | 100 | — | — | 100.00 | 100.00 |
| Pluracol WUC-25230** | — | — | — | 25.0 | 25.0 | — | — |
| Pluracol 1003** | — | — | — | 75.0 | 75.0 | — | — |
| 1,4-Butanediol | 12.0 | 12.0 | 12.0 | 14.0 | 14.0 | 7.6 | 7.0 |
| Ethylene glycol | 1.2 | | | 0.3 | 0.3 | — | — |
| Dabco E.G. | 0.6 | 0.5 | 0.5 | 1.0 | 1.0 | 1.0 | 1.0 |
| CS-604** | 0.7 | 0.5 | 0.5 | 0.4 | 0.2 | 0.15 | 0.15 |
| Polycat P-60** | — | — | 13 | 0.2 | 0.2 | — | — |
| Polycat SA-102** | 0.3 | 0.3 | 0.3 | — | — | — | — |
| Niax A-1** | 0.1 | 0.1 | 0.1 | — | 13 | — | — |
| Diethanolamine | — | 1.0 | 1.0 | 0.5 | 0.5 | — | — |
| L-5390 | 1.0 | 1.0 | 1.0 | — | — | — | — |
| L-540 | — | — | — | 2.0 | 2.0 | — | — |
| Pigment White 3100** | 4.0 | 4.0 | — | — | — | — | — |
| Brown Pigment** | — | — | 3.0 | 3.0 | 3.0 | 3.0 | 3.0 |
| F-11A** | 13.0 | 13.0 | 10.0 | 13.0 | 14.0 | 9.0 | 9.0 |
| Total (POLYOL RESIN; parts) | 132.9 | 132.4 | 128.4 | 134.4 | 135.2 | 121.25 | 120.8 |
| Prepolymer A**(parts) | — | — | — | 92.8 | 92.8 | — | — |
| Prepolymer B**(parts) | 82.4 | 80.7 | 80.4 | | | | |
| Airflex 100**[f] | — | — | — | — | — | 45.8/100 | 45.7/100 |
| Ratio of Isocyanate/Polyol | 62/100 | 61/100 | 62.6/100 | 69.1/100 | 68.5/100 | 37.7/100 | 38.4/100 |
| % of Dispersed Polymer in PU Foam | 3.1 | 3.0 | 3.1 | 6.6 | 6.6 | 0 | 0 |
| Index | 100 | 100 | 100 | 100 | 100 | 100 | 100 |
| Free Blowing Density (g./cc) | 0.15 | 0.16 | 0.253 | 0.167 | 0.155 | 0.27 | 0.25 |
| Time = Cream (sec.) | 12–16 | 14–17 | 15–18 | 15–18 | 20–24 | 16–18 | 14–17 |
| Rise (sec.) | 28–32 | 28–32 | '30–35 | 25–30 | 35–40 | 39–41 | 40–45 |
| Tack Free (sec.) | 32–36 | 35–40 | 35–40 | 30–35 | 40–45 | 50–52 | 50–55 |
| Snap (sec.) | 55–60 | 60–65 | 60–65 | 55–60 | 80–85 | 62–68 | 60–65 |
| Demold | 3'30" | 3' | 1'45" | 2' | 2'50" | 3' | 3' |
| Sample's Thickness (in.) | ¼ | ¼ | ¼ | ⅜ | ¼ | ¼ | ¼ |
| Density (g./cc) | 0.39 | 0.39 | 0.55 | 0.38 | 0.52 | 0.58 | 0.58 |
| Hardness (Shore A) | 50 | 52 | 65 | 65 | 75 | 60 | 60 |
| Ross Flex, $10^3$ Cycles at −18° C. (% Cutgrowth) | Not Measured | Not Measured | 100/0[c] 50/0 | — 150/0 | — 150/0 | 50/0 Break at 20[d] | 50/0 Break at 20 |
| Tensile Strength, (psi) | 250 | 305 | 477 | 420 | 604 | 591 | 456 |
| Elongation, % | 340 | 370 | 350 | 355 | 350 | 497 | 490 |
| Tear, pli, Die C (pli) | 70 | 75 | 110 | 105 | 135 | 145 | 119 |
| Abrasion loss (at 5000 cycles) (mg.)[e] | 795 | 667 | 450 | 357 | 62 | 954 | 1275 |
| Shoe soles molded, at density (gm/cm³) | 0.38 | 0.45 | 0.40 | 0.40 | 0.55 | 0.55 | |
| Shrinkage of sole | | None | None | None | None | Severe | None |

[a]Example 69 contained 0.5 part L-5302**.
[b]Example 70 contained 0.5 part L-5302** and 0.15 part water.
[c]Denotes % outgrowth at 100 −00 cycles.
[d]Denotes break of sample occurred between 10,000 to 20,000 cycles.
[e]Taber Abrasion loss (at 500 cycles) (mg), Wheel H-22.
[f]Parts Airflex 100 per 100 parts of Polyol Resin.

Analysis of the data from Table VII reveals the following general patterns: With the Airflex 100 Isocyanate (Formulations 69 and 70), only the product containing both water and fluorocarbon blowing agent (Formulation 70) exhibits no shrinkage at the molded density of 0.58 gm/cc in shoe soles. When this formulation is molded at 0.5 gm/cc or below, it too exhibits severe shrinkage. In contrast thereto, shoe soles molded using Formulations 64–68 (Prepolymers A and B) of the present invention exhibit no shrinkage even at molded density of 0.38 to 0.45. Ross Flex tests clearly demonstrate the superior behavior of the formulations of the present invention; compare Formulations 66–68 with Formulations 69–70. Moreover, it should be noted that the formulations containing dispersed vinyl polymer exhibited consistently better abrasion properties. In fact, at densities of about 0.5 gm/cc (Formulation 68) abrasion properties are about as good as is normally experienced with polyester formulations, known to be outstanding in this respect. The abrasion tests conducted in this test series were of the nature normally

EXAMPLES 71–73

The following three examples (Formulations 71–73) were hand-foamed to futher illustrate the use of polymer/polyol products in the prepolymer and in the "polyol resin" stream. For this purpose, Prepolymer B (Example 63) was foamed with a high vinyl polymer containing polyether polyol (Niax Polyol E-515), and one containing no vinyl polymer (Pluracol WUC-25230). Formulations 71–73 described in Table VIII gave excellent integral skin, open-cell microcellular foams exhibiting very low free blow densities. The data are recorded in Table VIII below.

TABLE VIII

| FORMULATIONS | 71 | 72 | 73 |
|---|---|---|---|
| Niax Polyol E-515** | 100 | — | 50 |
| Pluracol WUC-25230** | — | 100 | 50 |
| 1,4-Butanediol | 11 | 11 | 11 |
| Ethylene glycol | 0.3 | 0.3 | 0.3 |
| Dabco E.G.** | 1.0 | 1.0 | 1.0 |
| CS-604** | 0.8 | 0.8 | 0.8 |
| P-60** | 0.3 | 0.3 | 0.3 |
| Diethanolamine | 0.4 | 0.4 | 0.4 |
| H₂O | 0.15 | 0.15 | 0.15 |
| F-11A** | 13 | 13 | 13 |
| Brown Pigment** | 3 | 3 | 3 |
| L-548** | 2 | 2 | 2 |
| Total (POLYOL RESIN; parts) | 131.95 | 131.95 | 131.95 |
| Prepolymer A** | — | — | — |
| Prepolymer B** | 78.6 | 80.1 | 79.4 |
| Ratio of Isocyanate/Polyol | 59.6/100 | 60.7/100 | 60.2/100 |
| Approx. % Dispersed Polymer in PU Foam | 17.2 | 3 | 10.2 |
| Index | 1.00 | 1.00 | 1.00 |
| Free Blowing Density (g/cc) | 0.134 | 0.153 | 0.15 |
| Time: Cream (sec.) | 14–18 | 15–19 | 14–18 |
| Rise (sec.) | 25–28 | 30–35 | 25–30 |
| Tack Free (sec.) | 28–32 | 35–40 | 30–35 |
| Snap (sec.) | 50–55 | 60–65 | 55–60 |
| Observation | | | |
| Foam Structure | E | E | E |
| Cell Structure | O | O | O |
| Shrinkage Observed | N | N | N |

NOTES:
E = Excellent
O = Open
N = None

EXAMPLES 74–84

A series of hand foams from Prepolymer A (Example 62 supra) were prepared to further illustrate the wide operating latitude afforded by the novel prepolymers of the present invention. For this purpose, two polyether polyols, one containing about 28% by weight of dispersed vinyl polymer, the other containing no dispersed polymer (Pluracol WUC-25230**) were foamed employing different ratios of the non-vinyl polyether polymer and the vinyl polymer/polyether polyols. Excellent integral skin microcellular foams resulted over the entire composition range (Table IX, Formulations 74–84), further establishing the excellent operating latitude of novel liquid quasi-prepolymers. In Examples 74–84 as in Examples 71–73 supra a small amount of water was employed as a blowing agent in conjunction with the major fluorocarbon component. However, many additional experiments have indicated that the microcellular elastomers of the present invention can be prepared without resulting shrinkage in the absence of added water. The data are recorded in Table IX below.

TABLE IX

| FORMULATIONS | 74 | 75 | 76 | 77 | 78 | 79 | 80 | 81 | 82 | 83 | 84 |
|---|---|---|---|---|---|---|---|---|---|---|---|
| Niax Polyol E-515** | 100 | 90 | 80 | 70 | 60 | 50 | 40 | 30 | 20 | 10 | — |
| Pluracol WUC-25230** | — | 10 | 20 | 30 | 40 | 50 | 60 | 70 | 80 | 90 | 100 |
| 1,4-Butanediol | 11 | 11 | 11 | 11 | 11 | 11 | 11 | 11 | 11 | 11 | 11 |
| Ethylene Glycol | 0.3 | 0.3 | 0.3 | 0.3 | 0.3 | 0.3 | 0.3 | 0.3 | 0.3 | 0.3 | 0.3 |
| Dabco E.G.** | 1.0 | 1.0 | 1.0 | 1.0 | 1.0 | 1.0 | 1.0 | 1.0 | 1.0 | 1.0 | 1.0 |
| CS-604** | 0.8 | 0.8 | 0.8 | 0.8 | 0.8 | 0.8 | 0.8 | 0.8 | 0.8 | 0.8 | 0.8 |
| Diethanolamine | 0.3 | 0.3 | 0.3 | 0.3 | 0.3 | 0.3 | 0.3 | 0.3 | 0.3 | 0.3 | 0.5 |
| H₂O | 0.15 | 0.15 | 0.15 | 0.15 | 0.15 | 0.15 | 0.15 | 0.15 | 0.15 | 0.15 | — |
| F-11A** | 13 | 13 | 13 | 13 | 13 | 13 | 13 | 13 | 13 | 13 | 13 |
| Brown Pigment** | 3 | 3 | 3 | 3 | 3 | 3 | 3 | 3 | 3 | 3 | 3 |
| L-548** | 2.0 | 2.0 | 2.0 | 2.0 | 2.0 | 2.0 | 2.0 | 2.0 | 2.0 | 2.0 | 2.0 |
| Total (POLYOL RESIN; parts) | 131.55 | 131.55 | 131.55 | 131.55 | 131.55 | 131.55 | 131.55 | 131.55 | 131.55 | 131.55 | 131.50 |
| Prepolymer A** (parts) | 76.4 | 76.6 | 76.7 | 76.9 | 77 | 77.2 | 77.4 | 77.5 | 77.7 | 78 | 77.5 |
| Prepolymer B** (parts) | | | | | | | | | | | |
| Ratio of Isocyanate/Polyol | 58.1/100 | 58.2/100 | 58.3/100 | 58.4/100 | 58.5/100 | 58.7/100 | 58.8/100 | 58.9/100 | 59.1/100 | 59.3/100 | 58.9/100 |
| Approx. % Dispersed Polymer in PU Foam | 14.4 | 13.0 | 11.5 | 10.1 | 8.7 | 7.2 | 5.8 | 4.3 | 2.9 | 1.4 | 0 |
| Index | 100 | 100 | 100 | 100 | 100 | 100 | 100 | 100 | 100 | 100 | 100 |
| Free Blowing Density (g/cc) | 0.143 | 0.143 | 0.143 | 0.144 | 0.149 | 0.141 | 0.155 | 0.155 | 0.157 | 0.157 | 0.16 |
| Time = | | | | | | | | | | | |
| Cream (sec.) | 14–18 | 14–18 | 14–18 | 15–19 | 15–19 | 15–19 | 15–19 | 15–19 | 15–19 | 15–19 | 15–19 |
| Rise (sec.) | 25–30 | 25–30 | 26–30 | 28–33 | 30–35 | 30–35 | 30–35 | 30–35 | 30–35 | 30–35 | 30–35 |
| Tack Free (sec.) | 30–35 | 30–35 | 30–35 | 33+38 | 35–40 | 35–40 | 35–40 | 35–40 | 35–40 | 35–40 | 35–40 |
| Snap (sec.) | 60–65 | 60–65 | 60–65 | 60–65 | 65–70 | 65–70 | 65–70 | 65–70 | •70–75 | 70–75 | 65–70 |
| Observation | | | | | | | | | | | |
| Foam Structure | E | E | E | E | E | E | E | E | E | E | E |
| Cell Structure | O | O | O | O | O | O | O | O | O | O | O |
| Shrinkage Observed | N | N | N | N | N | N | N | N | N | N | N |

NOTES:
E = Excellent
O = Open
N = None

EXAMPLES 85-96

Quite surprisingly, indeed, the so-called high potency siloxane block copolymer surfactants are particularly useful as cell regulators for the microcellular foam process of the present invention.

Although low potency surfactants of the type disclosed in U.S. Pat. No. 3,741,917 are useful for the purpose of the present invention, the high potency surfactants are preferred (typical low potency surfactants employed in the present invention comprise L-5303, L-5305, L-5307 and L-5309). Suitable high potency surfactants include L-520, L-6202, L-540, L-548, L-550** and L-560 (available from Union Carbide Corporation). The high potency surfactants normally yield integral skin microcellular foams, characterized by severe shrinkage, from systems comprising the polyether polyols utilized in the present invention in combination with the polyether prepolymers utilized in the prior art shoe sole formulations. Consequently, the present discovery is indeed surprising since high potency siloxane block copolymers yield molded shoe products exhibiting exceptionally uniform and small cell structure, free of voids, fissures and splits. In contrast thereto, low potency surfactants do at times exhibit some blemishes in this respect.

The preferred high potency surfactants utilized in the present invention comprise siloxane block copolymer surfactants having molecular weights in the range of from about 3000 to about 9000, a siloxane content of from 30% to about 70% by weight based on the weight of the copolymer. The polyether segment(s) of said copolymer surfactant has an oxypropylene content of from 70% to about 30% by weight and an oxyethylene content of from about 30% to about 70% by weight based on the weight of said polyether segment(s) of the polysiloxane-polyoxyalkylene copolymer. The high potency copolymer surfactants which can be utilized in the practice of preferred embodiments of the present invention can contain tetrafunctional, trifunctional, difunctional and monofunctional siloxane groups, or combinations of such siloxane groups and they can have the same or different substituents bonded to the Si atom as, for example, methyl, ethyl, phenyl, etc. The polyether portions or blocks of polysiloxane copolymes represent oxyalkylene groups comprising oxyethylene/oxypropylene copolymer groups, with the proviso that at least 70% by weight, preferably 40–60% by weight, are ethyleneoxy groups to give the oxyalkylene block a desired amount of hydrophilicity. Preferably, the oxyalkylene groups consist essentially of oxyethylene and oxypropylene groups copolymerized in random manner.

The copolymer surfactants useful in the practice of the invention can be hydrolyzable polyoxyalkylene-polysiloxanes in which Si is bonded to carbon through the oxy (—O—) group, i.e, $\equiv$Si—O—C$\equiv$, or they can be the nonhydrolyzable polyoxyalkylene-polysiloxanes in which Si is monovalently bonded directly to carbon, i.e., $\equiv$Si—C$\equiv$.

Table X infra (Formulations 95–96) demonstrates the usefulness of high potency surfactants in producing outstanding integral skin microcellular foams without shrinkage being observed. In addition to the surfactants illustrated above and/or demonstrated in Table X, a number of other high efficiency surfactants, e.g., Dow corning 191 and 196, also have been tested successfully. Data and results are recorded in Table X infra.

TABLE X

| FORMULATIONS | 85 | 86 | 87 | 88 | 89 | 90 |
|---|---|---|---|---|---|---|
| Niax Polyol 34-28** | 100 | 100 | 100 | 100 | 100 | 100 |
| Niax Polyol 11-27** | — | — | — | — | — | — |
| 1,4-Butanediol | 11 | 11 | 11 | 11 | 11 | 11 |
| Ethylene Glycol | — | — | — | — | — | — |
| Dabco E.G.** | 1.5 | 1.5 | 1.5 | 1.5 | 1.5 | 1.5 |
| P-60** | 0.5 | 0.5 | 0.5 | 0.5 | 0.25 | — |
| CS-604** | 0.5 | 0.5 | 0.5 | 0.5 | 0.7 | 0.8 |
| P-9** | 0.5 | 0.5 | 0.5 | — | — | — |
| Diethanolamine | — | 0.5 | 0.3 | 0.3 | 0.3 | — |
| H$_2$O | 0.15 | 0.15 | 0.15 | 0.15 | 0.15 | 0.15 |
| F-11A** | 13 | 13 | 13 | 13 | 13 | 13 |
| Brown Pigment** | 3 | 3 | 3 | 3 | 3 | 3 |
| Surfactant | | | | | | |
| L-6202** | 2.0 | | | | | |
| L-548** | | 2.0 | 2.0 | 2.0 | 2.0 | 2.0 |
| L-540** | | | | | | |
| L-5710** | | | | | | |
| L-5720** | | | | | | |
| Total | 132.15 | 132.65 | 132.45 | 131.95 | 131.90 | 131.75 |
| Prepolymer A** | 76.8 | 80 | 79 | 79 | 79 | 79 |
| Prepolymer B** | | | | | | |
| Ratio of Isocyanate/Polyol | 58.1/100 | 60.3/100 | 59.6/100 | 59.9/100 | 59.9/100 | 60/100 |
| Approx. % Dispersed Polymer in PU Foam | 9.6 | 9.4 | 9.4 | 9.4 | 9.4 | 9.4 |
| Index | 100 | 100 | 100 | 100 | 100 | 100 |
| Free Blowing Density (gm/cm$^3$) | 0.16 | 0.15 | 0.14 | 0.143 | 0.14 | 0.145 |
| Time = Cream (sec.) | 11–14 | 10–13 | 10–13 | 13–17 | 14–18 | 14–18 |
| Rise (sec.) | 20–24 | 20–24 | 20–24 | 24–28 | 24–28 | 24–28 |
| Tack Free (sec.) | 24–28 | 24–28 | 24–28 | 28–32 | 28–32 | 28–32 |
| Snap (sec.) | 45–50 | 45–50 | 45–50 | 55–60 | 55–60 | 55–60 |
| Observation | | | | | | |
| Foam Structure | G | E | E | E | E | E |
| Cell Structure | O | O | O | O | O | O |
| Shrinkage Observed | N | N | N | N | N | N |
| FORMATIONS | 91 | 92 | 93 | 94 | 95 | 96 |
| Niax Polyol 34-28** | 100 | 100 | 100 | 100 | 100 | 100 |
| Miax Polyol 11-27** | 11 | 11 | 11 | 11 | 11 | 11 |

TABLE X-continued

| | | | | | | |
|---|---|---|---|---|---|---|
| 1,4-Butanediol | 0.6 | 0.6 | 0.4 | 0.4 | 0.4 | 0.4 |
| Ethylene Glycol | 0.7 | 0.8 | 0.8 | 0.8 | 0.8 | 1.0 |
| Dabco E.G.** | 0.3 | 0.3 | 0.3 | 0.3 | 0.3 | 0.3 |
| P-60** | 1.0 | 1.0 | 1.0 | 1.0 | 1.0 | 1.0 |
| CS-604** | — | — | — | — | — | — |
| P-9** | 0.3 | 0.3 | 0.4 | 0.4 | 0.4 | 0.4 |
| Diethanolamine | 0.15 | 0.15 | 0.15 | 0.15 | 0.15 | 0.15 |
| H$_2$O | 13 | 13 | 13 | 13 | 13 | 13 |
| F-11A** | 3 | 3 | 3 | 3 | 3 | 3 |
| Brown Pigment** | | | | | | |
| Surfactant | | | | | | |
| L-6202** | 2.0 | 2.0 | | | | 2.0 |
| L-548** | | | 2.0 | | | |
| L-540** | | | | 2.0 | | |
| L-5710** | | | | | 2.0 | |
| Total | 132.05 | 132.15 | 132.95 | 132.95 | 132.95 | 132.95 |
| Prepolymer A** | 78 | 78 | 78 | 78 | 78 | |
| Prepolymer B** | | | | | | 78 |
| Ratio of Isocyanate/Polyol | 59.1/100 | 59/100 | 58.7/100 | 58.7/100 | 58.7/100 | 58.7/100 |
| Approx. % Dispersed Polymer in PU Foam | 9.5 | 9.5 | 9.5 | 9.5 | 9.5 | 12.4 |
| Index | 100 | 100 | 100 | 100 | 100 | 100 |
| Free Blowing Density (gm.cm$^3$) | 0.135 | 0.135 | 0.138 | 0.138 | 0.138 | 0.142 |
| Time = Cream (sec.) | 14–18 | 13–17 | 13–17 | 13–17 | 13–17 | 13–17 |
| Rise (sec.) | 24–28 | 24–28 | 24–28 | 24–28 | 24–28 | 24–28 |
| Tack Free (sec.) | 28–32 | 28–32 | 28–32 | 28–32 | 28–32 | 28–32 |
| Snap (sec.) | 50–55 | 50–55 | 50–55 | 50–55 | 50–55 | 50–55 |
| Observation | | | | | | |
| Foam Structure | E | E | E | G | E | E |
| Cell Structure | O | O | O | O | O | O |
| Shrinkage Observed | N | N | N | N | N | N |

NOTES:
G = Good
E = Excellent
O = Open

EXAMPLES 97–98

In addition to the commonly employed alkanediol chain extenders, excellent results have also been observed with diethylene and triethylene glycols using the procedure described previously. The formulations and data are shown in Table XI below.

TABLE XI

| FORMULATION, PARTS BY WEIGHT | 97 | 98 |
|---|---|---|
| Niax Polyol 11-27** | 100 | — |
| Niax Polyol 34-28** | — | 100 |
| Diethylene Glycol | 14.01 | — |
| Triethylene Glycol | — | 20.0 |
| Diethanolamine | 0.50 | 0.50 |
| Dabco E.G.** | 1.30 | 1.30 |
| Polycat 60** | 0.10 | 0.10 |
| CS-604** | 0.10 | 0.10 |
| L-5309** | 2.0 | 2.0 |
| Freon 11A** | 13.0 | 13.0 |
| Prepolymer A | 78.4 | 78.7 |
| Index | 100 | 100 |
| Time = Cream (sec.) | 16–18 | 15–17 |
| Rise (sec.) | 40–45 | 35–40 |
| Tack Free (sec.) | 55–60 | 50–55 |
| Snap (sec.) | 70–75 | 75–80 |
| Free Blow Density (gm/cc) | 0.16 | 0.17 |
| Foam Structure | Excellent Open | Excellent Open |

Similar microcellular polyurethane foams of excellent structure were prepared from various blends of Niax Polyol 11-27 and Niax Polyol 34-28. Such products are particularly suitable for the molding of integral skin components such as automotive arm rests, tractor and bicycle seats, and the like.

What is claimed is:

1. An integral skin microcellular polyether polyurethane elastomer product having a specific gravity in the range approximating about 0.4 to about 0.7 gm/cm$^3$ produced by reacting a formulation comprising:

(a) liquid quasi-polyoxyethyleneoxypropylene prepolymers having a crystalline point below about 13° C. resulting from the reaction of (1) a mixture consisting essentially of (i) a normally-solid diphenylmethane diisocyanate and (ii) the carbodiimide of diphenylmethane diisocyanate and/or the uretone imine of diphenylmethane diisocyanate, or (iii) the carbodiimide of tolylene diisocyanate and/or the uretone imine of tolylene diisocyanate; with (2) an ethylene oxide capped polyol of the group consisting of poly(oxyethyleneoxypropylene)polyols and polymer/poly(oxyethyleneoxypropylene)polyols and mixtures thereof, said ethylene oxide capped polyol having a hydroxyl equivalent weight of about 750 to about 3000, a hydroxyl functionality of 2 to 3, an oxyethylene cap of about 10 to about 30% by weight, and an internal oxyethylene content of from about 0 to 40% by weight, the total oxyethylene content of said capped polyol not exceeding about 50% by weight, the remainder of the capped polyol consisting essentially of oxypropylene;

(b) an ethylene oxide capped polyol of the group consisting of poly(oxyethyleneoxypropylene)polyols and polymer/poly(oxyethyleneoxypropylene)polyols and mixtures thereof, said ethylene oxide capped polyol having the characteristics set forth in (a) above;

(c) a difunctional chain extender characterized by hydroxyl and/or amino groups containing amino hydrogen;

(d) said reaction taking place in the presence of a halogenated hydrocarbon blowing agent;

(e) said reaction being effected at an NCO index number in the range of from 94 to 105; and (f) in the presence of polymer particles stably dispersed in said quasi-prepolymer (a) above and/or capped polyol (b) above, the total polymer content not exceeding about 25% by weight, based on the total weight of the formulation.

2. The integral skin microcellular elastomer product of claim 1 wherein said liquid mixture consists essentially of a normally-solid diphenylmethane diisocyanate and small amounts of its diisocyanato carbodiimide and/or its triisocyanato uretone imine.

3. The integral skin microcellular elastomer product of claim 1 wherein said mixture consists essentially of a normally-solid diphenylmethane diisocyanate, and small amounts of the diisocyanato carbodiimide of tolylene diisocyanate and/or the triisocyanato uretone imine of tolylene diisocyanate.

4. The integral skin microcellular elastomer product of claim 1 wherein said mixture consists essentially of normally-solid, relatively high purity 4,4'-diphenylmethane diisocyanate, and small amounts of the diisocyanato carbodiimide of 4,4'-diphenylmethane diisocyanate and/or the triisocyanato uretone imine of 4,4'-diphenylmethane diisocyanate.

5. The integral skin microcellular elastomer product of claim 2 wherein said liquid, quasi-polyoxyethyleneoxypropylene prepolymers have an NCO equivalent weight in the range of from about 200 to 280 and wherein said mixture consists essentially of diphenylmethane diisocyanate and its carbodiimide and/or its uretone imine has an NCO equivalent weight in the range of 125.5 to 137.

6. The integral skin microcellular elastomer product of claim 5 wherein said liquid quasi-polyoxyethyleneoxypropylene prepolymers have a crystalline point below about 10° C.

7. The integral skin microcellular elastomer product of claim 5 wherein said mixture has an NCO equivalent weight in the range of from about 126 to 135.

8. The integral skin microcellular elastomer product of claim 2 wherein said ethylene oxide capped polyol reactant (b) is a polymer/poly(oxyethyleneoxypropylene)polyol.

9. The integral skin microcellular elastomer product of claim 2 wherein said ethylene oxide capped polyol reactant (b) is a poly(oxyethyleneoxypropylene)polyol.

10. The integral skin microcellular elastomer product of claim 2 wherein the polyoxyethyleneoxypropylene segment of said liquid quasi-prepolymers is derived from polymer/poly(oxyethyleneoxypropylene)polyol.

11. The integral skin microcellular elastomer product of claim 2 wherein said ethylene oxide capped polyol reactant (b) is a polymer/poly(oxyethyleneoxypropylene)polyol and wherein the said polyoxyethyleneoxypropylene segment of said liquid quasi-prepolymers is derived from a poly(oxyethyleneoxypropylene)polyol.

12. The integral skin microcellular elastomer product of claim 1 characterized by a specific gravity below 0.55 gm/cm$^3$ and possessing excellent low temperature dynamic flex and green strength at demold.

13. The integral skin microcellular elastomer product of claim 8 in the form of a shoe sole.

14. The integral skin microcellular elastomer product of claim 2 characterized by a specific gravity in the range of from about 0.4 to 0.55 gm/cm$^3$ and possessing excellent low temperature dynamic flex and green strength at demold.

15. The integral skin microcellular elastomer product of claim 5 wherein said liquid quasi-polyoxyethyleneoxypropylene prepolymers are derived from ethylene oxide capped polyols having a hydroxyl equivalent weight of from about 850 to about 2500, and a hydroxyl functionality of 2 to about 2.6.

16. The integral skin microcellular elastomer product of claim 15 characterized by a specific gravity in the range of from about 0.4 to 0.55 gm/cc$^3$, excellent low temperature dynamic flex and green strength at demold, said product being in the form of a shoe sole.

17. The integral skin microcellular elastomer product of claim 1 produced by effecting the reaction at an NCO index number in the range of from 97 to 103.

18. The integral skin microcellular elastomer product of claim 7 wherein said liquid quasi-polyoxyethyleneoxypropylene prepolymers are derived from ethylene oxide capped polyols which have a hydroxyl functionality of 2.

19. The integral skin microcellular elastomer product of claim 18 wherein said liquid quasi-polyoxyethyleneoxypropylene prepolymers have a crystalline point below about 5° C.

20. An integral skin microcellular polyether polyurethane product essentially free of sink marks, possessing a smooth surface essentially devoid of blemishes, and a specific gravity of from 0.4 to about 0.7 gm/cm$^3$, produced by reacting a system comprising:

(a) liquid quasi-polyoxyethyleneoxypropylene prepolymers having a crystalline point below about 13° C. resulting from the reaction of (1) a mixture consisting essentially of (i) a normally-solid diphenylmethane diisocyanate, and small amounts of (ii) the carbodiimide of diphenylmethane diisocyanate and/or the uretone imine of diphenylmethane diisocyanate or (iii) the carbodiimide of tolylene diisocyanate and/or the uretone imine of tolylene diisocyanate; with (2) an ethylene oxide capped polyol of the group consisting of poly(oxyethyleneoxypropylene)polyols and polymer/poly(oxyethyleneoxypropylene)polyols and mixtures thereof, said ethylene oxide capped polyol having a hydroxyl equivalent weight of about 750 to about 3000, a hydroxyl functionality of 2 to 3, an oxyethylene cap of about 10 to about 30% by weight, and an internal oxyethylene content of from 0 and upwards to 40% by weight, the total oxyethylene content of said capped polyol not exceeding about 50% by weight, the remainder of the capped polyol consisting essentially of oxypropylene;

(b) an ethylene oxide capped polyol of the group consisting of poly(oxyethyleneoxypropylene)polyols and polymer/poly(oxyethyleneoxypropylene)polyols and mixtures thereof, said ethylene oxide capped polyol having a hydroxyl equivalent weight of about 850 to about 2500, a hydroxyl functionality of from about 2.1–2.2 to about 2.8, an ethylene oxide cap of from about 10 to 25% by weight, an internal oxyethylene content of from 0 to 40% by by weight, the total oxyethylene content of said capped polyol not exceeding about 50% by weight, the remainder of the capped polyol consisting essentially of oxypropylene;

(c) a difunctional chain extender characterized by hydroxyl and/or amino groups consisting amino hydrogen;

(d) said reaction taking place in the presence of a halocarbon blowing agent and without the use of water as a secondary blowing agent;

(e) said reaction being effected at an NCO index number in the range of from 94 to 105; and (f) in the presence of polymer particles stably dispersed in said quasi-prepolymer (a) above and/or capped polyol (b) above, the total polymer content not exceeding about 20% by weight, based on the total weight of the system.

21. The integral skin microcellular product of claim 20 characterized by a specific gravity in the range of about 0.4 to below about 0.55 gm/cm$^3$.

22. The integral skin microcellular product of claim 21 wherein said ethylene oxide capped polyol reactant (b) is a polymer/poly(oxyethyleneoxypropylene)polyol.

23. The integral skin microcellular product of claim 21 wherein the polyoxyethyleneoxypropylene segment of said liquid quasi-prepolymers is derived from a poly(oxyethyleneoxypropylene)polyol.

24. The integral skin microcellular product of claim 22 wherein the system is reacted at an NCO index number of from about 97 to about 103.

25. Liquid quasi-polyoxyethyleneoxypropylene prepolymers having a crystalline point below about 13° C. resulting from the reaction of (1) a liquid mixture consisting essentially of (i) a normally-solid diphenylmethane diisocyanate, and (ii) the carbodiiide of diphenylmethane diisocyanate and/or the uretone imine of diphenylmethane diisocyanate, or (iii) the carbodiimide of tolylene diisocyanate and/or the uretone imine of tolylene diisocyanate; with (2) an ethylene oxide capped polyol of the group consisting of poly(oxyethyleneoxypropylene)polyols and polymer/poly(oxyethyleneoxypropylene)polyols and mixtures thereof, said ethylene oxide capped polyol having a hydroxyl equivalent weight of about 750 to about 3000, a hydroxyl functionality of 2 to 3, an oxyethylene cap of about 10 to about 30% by weight, and an internal oxyethylene content of from 0 to 40% by weight, the total oxyethylene content of said capped polyol not exceeding about 50% by weight, the remainder of the capped polyol consisting essentially of oxypropylene.

26. The liquid quasi-prepolymers of claim 25 wherein said mixture consists essentially of a normally-solid diphenylmethane diisocyanate and its diisocyanato carbodiimide and/or its triisocyanato uretone imine, said liquid quasi-prepolymers possessing an NCO equivalent weight in the range of from about 200 to about 280.

27. The liquid quasi-prepolymers of claim 25 wherein said mixture consists essentially of a normally-solid diphenylmethane diisocyanate, and small amounts of the diisocyanato carbodiimide of tolylene diisocyanate and/or the triisocyanato uretone imine of tolylene diisocyanate.

28. The liquid quasi-prepolymers of claim 26 wherein said mixture consists essentially of relatively high purity 4,4'-diphenylmethane diisocyanate and its diisocyanato carbodiimide and/or its triisocyanato uretone imine said mixture having an NCO equivalent weight in the range of 125.5 to about 137.

29. The liquid quasi-prepolymers of claim 26 which are characterized by an NCO equivalent weight of from about 215 to about 255.

30. The liquid quasi-prepolymers of claim 28 wherein said ethylene oxide capped polyol has a hydroxyl functionality of 2 to about 2.6.

31. The liquid quasi-prepolymers of claim 30 wherein said ethylene oxide capped polyol has a hydroxyl equivalent weight of about 850 to about 2500, and a hydroxyl functionality of 2 to about 2.3.

32. The liqud quasi-prepolymers of claim 30 wherein said mixture consisting essentially of relatively high purity of 4,4'-diphenylmethane diisocyanate and its diisocyanato carbodiimide and/or its triisocyanato uretone imine has an NCO equivalent weight in the range of from about 126 to 135.

33. The liquid quasi-prepolymers of claim 32 wherein said mixture is characterized by an NCO equivalent weight of from 126–127 to about 130–132.

34. The liquid quasi-prepolymers of claim 32 characterized by a crystalline point below about +10° C. and above about −20° C.

35. The liquid quasi-prepolymers of claim 34 characterized by an NCO equivalent weight of from about 215 to about 255.

36. The liquid quasi-prepolymers of claim 32 wherein said ethylene oxide capped polyol is a polymer/poly(oxyethyleneoxypropylene)polyol.

37. The liquid quasi-prepolymers of claim 32 wherein said ethylene oxide capped polyol is a poly(oxyethyleneoxypropylene)polyol.

38. The liqud quasi-prepolymers of claim 32 wherein said ethylene oxide capped polyol has a hydroxyl functionality of 2.

39. A multi-package curable system useful in the manufacture of integral skin microcellular polyether polyurethane products having specific gravities in the range of from about 0.4 to about 0.7 gm/cm$^3$ comprising Component A and Component B:

(a) said Component A containing the liqud quasi-polyoxyethyleneoxypropylene prepolymers defined in claim 1(a), and (b) said Component B consisting essentially of a compatible liquid mixture of (i) an ethylene oxide capped polyol of the group consisting of poly(oxyethyleneoxypropylene)polyols and polymer/poly(oxyethyleneoxypropylene)polyols and mixtures thereof, as defined in claim 1(b); (ii) a difunctional extender, optionally in admixture with small amounts of a trifunctional extender, said difunctional and trifunctional extenders characterized by hydroxyl groups and/or amino groups which contain amino hydrogen; and (iii) an halogenated hydrocarbon blowing agent;

(c) said Component A and said Component B used in amounts so as to provide upon mixing up to 25% by weight of polymer particles stably dispersed in the resulting admixture.

40. The multi-package curable system of claim 39 wherein said liquid quasi-prepolymers have an NCO equivalent weight of about 200 to 280.

41. The multi-package curable system of claim 40 wherein Component B is essentially void of water as a secondary blowing agent.

* * * * *